(12) United States Patent
Li et al.

(10) Patent No.: US 12,542,949 B1
(45) Date of Patent: Feb. 3, 2026

(54) SYSTEMS AND METHODS FOR LATENCY OPTIMIZATION FOR CLOUD APPLICATIONS

(71) Applicant: Avago Technologies International Sales Pte. Limited, Singapore (SG)

(72) Inventors: Gordon Yong Li, San Diego, CA (US); Charlie Lei Lou, Poway, CA (US); Rajesh Shankarrao Mamidwar, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/788,594

(22) Filed: Jul. 30, 2024

(51) Int. Cl.
*H04N 21/462* (2011.01)
*H04N 21/43* (2011.01)
*H04N 21/439* (2011.01)
*H04N 21/44* (2011.01)

(52) U.S. Cl.
CPC .......... *H04N 21/4621* (2013.01); *H04N 21/43072* (2020.08); *H04N 21/4392* (2013.01); *H04N 21/44004* (2013.01)

(58) Field of Classification Search
CPC ........ H04N 21/43072; H04N 21/4392; H04N 21/44004; H04N 21/4621
See application file for complete search history.

(56) References Cited

U.S. PATENT DOCUMENTS

| | | | | |
|---|---|---|---|---|
| 4,570,232 A | * | 2/1986 | Shikano | G10L 15/12 704/241 |
| 5,467,139 A | * | 11/1995 | Lankford | H04N 7/56 375/E7.278 |
| 5,598,557 A | * | 1/1997 | Doner | G06F 16/3346 707/999.005 |
| 6,085,160 A | * | 7/2000 | D'hoore | G10L 15/005 704/277 |
| 6,186,834 B1 | * | 2/2001 | Arnett | H01R 13/6467 439/676 |
| 6,188,987 B1 | * | 2/2001 | Fielder | H04N 21/4342 704/229 |
| 6,442,518 B1 | * | 8/2002 | Van Thong | G10L 15/26 704/235 |
| 6,473,778 B1 | * | 10/2002 | Gibbon | G06F 40/103 715/201 |
| 6,744,473 B2 | * | 6/2004 | Wells | H04N 21/43072 348/518 |
| 7,047,191 B2 | * | 5/2006 | Lange | G10L 15/26 704/235 |

(Continued)

*Primary Examiner* — Michael B. Pierorazio
(74) *Attorney, Agent, or Firm* — Foley & Lardner LLP

(57) ABSTRACT

Described embodiments provide systems and methods for latency optimization for cloud applications. An agent of a client device comprising an audio decoder and a video decoder can monitor video and audio data paths of an application communicating audio/video (A/V) data from one or more servers to the client device. The agent can measure, using the audio decoder and the video decoder, an A/V latency and a lip-sync status of the video and audio data paths of the application. The agent can determine, based on at least one or more measurements of the A/V latency and the lip-sync status, to enable a low latency mode for at least one of the video decoder or the audio decoder. The agent can configure, responsive to the determination, the low latency mode on one of the video decoder or the audio decoder.

20 Claims, 11 Drawing Sheets

(56) References Cited

U.S. PATENT DOCUMENTS

| | | | | |
|---|---|---|---|---|
| 7,065,524 B1* | 6/2006 | Lee | G16H 50/50 | 706/45 |
| 7,092,888 B1* | 8/2006 | McCarthy | G10L 15/1822 | 704/277 |
| 7,509,385 B1* | 3/2009 | Rittmeyer | G06Q 10/107 | 715/224 |
| 7,729,917 B2* | 6/2010 | Miyamoto | G10L 15/22 | 704/275 |
| 7,739,253 B1* | 6/2010 | Yanovsky | G06F 16/9535 | 707/706 |
| 7,801,910 B2* | 9/2010 | Houh | G06F 16/583 | 707/765 |
| 7,962,331 B2* | 6/2011 | Miller | G10L 15/193 | 704/235 |
| 8,121,432 B2* | 2/2012 | Dorai | G06F 16/7844 | 382/276 |
| 8,131,545 B1* | 3/2012 | Moreno | G10L 15/04 | 704/235 |
| 8,423,363 B2* | 4/2013 | Gupta | G10L 15/22 | 704/251 |
| 8,451,375 B2* | 5/2013 | Ejima | H04N 5/04 | 348/515 |
| 8,572,488 B2* | 10/2013 | Phillips | G06F 3/0482 | 715/716 |
| 8,687,118 B2* | 4/2014 | Ejima | H04N 21/43632 | 348/515 |
| 8,891,013 B2* | 11/2014 | Ejima | H04N 21/43072 | 348/515 |
| 12,101,528 B2* | 9/2024 | Leigh | H04N 21/4627 | |
| 2002/0055950 A1* | 5/2002 | Witteman | G06F 16/40 | 707/E17.009 |
| 2002/0093591 A1* | 7/2002 | Gong | H04N 21/2368 | 348/E7.063 |
| 2003/0025832 A1* | 2/2003 | Swart | H04N 21/4828 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G11B 27/10 | 386/328 |
| 2004/0096110 A1* | 5/2004 | Yogeshwar | G06F 16/51 | 707/E17.031 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2006/0248073 A1* | 11/2006 | Jones | G06F 16/3328 | 707/999.005 |
| 2007/0011012 A1* | 1/2007 | Yurick | G10L 15/26 | 704/277 |
| 2007/0124147 A1* | 5/2007 | Gopinath | G10L 15/19 | 704/E15.021 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2007/0214164 A1* | 9/2007 | MacLennan | G06F 16/90 | |
| 2008/0066138 A1* | 3/2008 | Bishop | G06F 40/58 | 725/137 |
| 2008/0166106 A1* | 7/2008 | Ozawa | H04N 21/8113 | 386/245 |
| 2008/0255844 A1* | 10/2008 | Wu | G10L 15/193 | 704/E15.022 |
| 2008/0266449 A1* | 10/2008 | Rathod | H04N 21/8133 | 348/E7.001 |
| 2008/0270134 A1* | 10/2008 | Miyamoto | H04N 7/0885 | 348/E7.071 |
| 2009/0073316 A1* | 3/2009 | Ejima | H04N 5/04 | 348/739 |
| 2009/0171662 A1* | 7/2009 | Huang | G10L 15/1822 | 704/E15.041 |
| 2010/0091187 A1* | 4/2010 | Topiwalla | H04N 21/4355 | 348/E7.003 |
| 2011/0022386 A1* | 1/2011 | Gatzke | G10L 15/26 | 704/235 |
| 2011/0040559 A1* | 2/2011 | Kim | G10L 21/055 | 704/271 |
| 2012/0101817 A1* | 4/2012 | Mocenigo | G10L 15/063 | 704/E15.001 |
| 2012/0253799 A1* | 10/2012 | Bangalore | G10L 15/183 | 704/E15.001 |
| 2013/0250174 A1* | 9/2013 | Ejima | H04N 21/43072 | 348/515 |
| 2014/0160351 A1* | 6/2014 | Ejima | H04N 21/43072 | 348/515 |
| 2015/0046965 A1* | 2/2015 | Shanson | G11B 20/10527 | 725/116 |
| 2016/0007054 A1* | 1/2016 | Polumbus | G11B 27/10 | 725/116 |

* cited by examiner

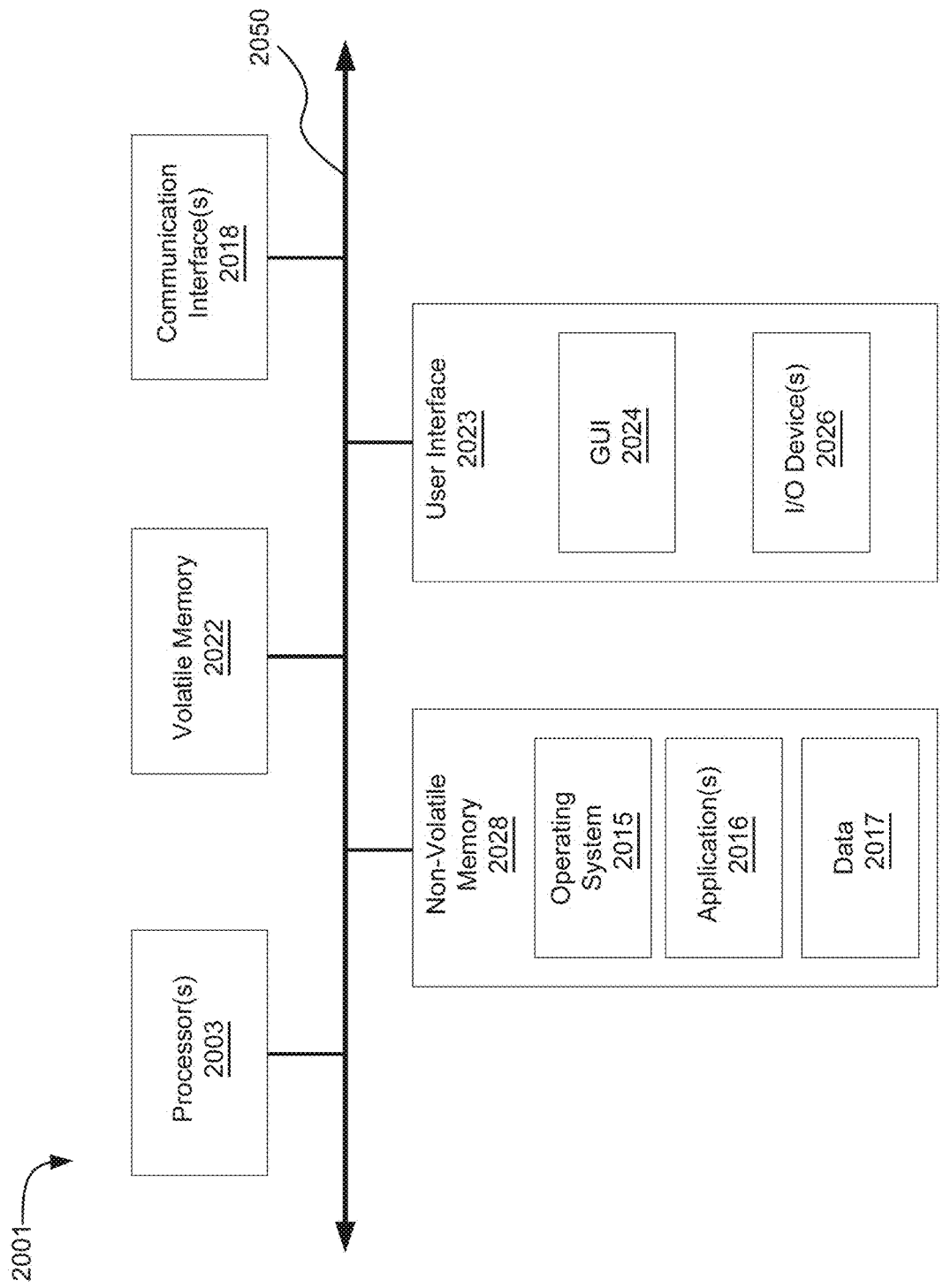

SYSTEMS AND METHODS FOR LATENCY OPTIMIZATION FOR CLOUD APPLICATIONS

FIELD OF THE DISCLOSURE

This disclosure generally relates to systems for and methods of communication, including but not limited to, communications associated with internet service provider (ISP) networks, cable modems, gigabit passive optical network (GPON) devices, set-top boxes, televisions, user devices, Ethernet network devices, and/or wireless devices. Some embodiments in the disclosure relate to latency optimization for cloud applications for such communications and/or control of devices and networks for low latency operations.

BACKGROUND

Latency issues in communications between a home network and an ISP can lead to various challenges and disruptions in internet connectivity and user experience, especially for evolving low latency usages including but not limited to video conferencing, cloud gaming, augmented reality/virtual reality (AR/VR) applications, and metaverse applications.

ISPs are companies that provide internet access to individuals and businesses. ISPs generally own, lease and manage a network infrastructure that connects users to the internet. This infrastructure can include various components such as data centers, routers, switches, coaxial cables, and fiber optic cables. ISPs obtain internet connectivity from larger networks, such as backbone providers or internet exchange points (IXPs), and distribute communication services to their customers.

Latency can be associated with one or more parties (e.g., cloud providers, ISPs, application developers and silicon vendors) and one or more devices and networks, including but not limited to ISP networks, cables modems, GPON devices, set top boxes, WiFi networks, Ethernet networks, access networks, backbone networks, and cloud infrastructure. To support internet speeds, ISPs are using larger burst data communications which often require larger buffers at each node. Larger bursts/buffers can increase communication latencies.

Latency can be manifested as slow response times (e.g., when loading web pages, streaming videos, or downloading files), decreased quality of real-time applications (e.g., low latency applications that rely on real-time communication, such as video conferencing, voice over IP (VoIP) calls, and online gaming), buffering and interruptions in streaming, unstable connections, adverse impact on cloud-based services (e.g., file storage, email, and productivity tools, affecting productivity and efficiency), increased vulnerability to cyberattacks, and limited capacity for interactive applications (e.g., limit the effectiveness of interactive applications that require real-time user input, such as online collaborative tools, virtual classrooms, and remote desktop applications). High latency can result in choppy video/audio playback, laggy conversations, and delayed reactions in online games, leading to a poor user experience and communication difficulties. High latency can result in data packets arriving out of order or being delayed, leading to pauses in playback and degraded streaming quality. High latency can provide attackers with more time to exploit security vulnerabilities and launch malicious attacks, such as distributed denial-of-service (DDoS) attacks or man-in-the-middle (MitM) attacks.

SUMMARY

This Summary is provided to introduce a selection of concepts in a simplified form that are further described below in the Detailed Description. This Summary is not intended to identify key features or essential features, nor is it intended to limit the scope of the claims included herewith.

In certain communication systems, devices can execute applications to facilitate a range of interactions with one or more other devices or servers within the network. These applications can include latency-sensitive applications (e.g., providing latency-sensitive functionalities) and non-latency-sensitive applications (e.g., applications that tolerate relatively longer delays between the devices). Various systems may configure one or more devices within the network in low latency mode to support latency-sensitive data exchange or communication for low latency applications. However, it may be resource-inefficient to configure the devices in low latency mode without considering whether the data latency is within an acceptable level. Hence, the systems and methods of the technical solution discussed herein can perform latency and lip-sync measurements to optimize latency for various applications while minimizing resource consumption.

The systems and methods of the technical solution can monitor the execution of low latency applications on at least one device. Upon detection of the execution of the low latency application, the systems and methods can perform link latency, audio/video (A/V) latency measurement, and/or lip-sync measurement. The systems and methods can determine whether the measurements are within an acceptable latency level, such as by comparing a respective measurement to a predefined threshold. The systems and methods can configure the device (or one or more other network devices) in low latency mode if at least one of the measurements is at or above the predefined threshold. The systems and methods can periodically monitor the link latency status, e.g., perform the latency measurement periodically. The systems and methods can disable the low latency mode according to the link latency status (e.g., latency is below the predefined threshold) or in response to the low latency application being suspended. By activating or disabling the low latency mode according to the latency status, the systems and methods of the technical solution discussed herein can minimize resource consumption or power usage, reduce burden or load on the hardware of the devices, and improve latency for applications by reducing the duration of the low latency mode, while improving or maintaining support for low latency communication.

In one aspect, the present disclosure is directed to a method for latency optimization for cloud applications. The method can include monitoring, by an agent of a client device comprising an audio decoder and a video decoder, video and audio data paths of an application communicating audio/video (A/V) data from one or more servers to the client device. The method can include measuring, by the agent using the audio decoder and the video decoder, an A/V latency and a lip-sync status of the video and audio data paths of the application. The method can include determining, by the agent based on at least one or more measurements of the A/V latency and the lip-sync status, to enable a low latency mode for at least one of the video decoder or the audio decoder. The method can include configuring, by the agent responsive to the determination, the low latency mode on one of the video decoder or the audio decoder.

The method can include synchronizing, by the agent responsive to the determination of the lip-sync status, the video and audio data paths at the client device using one of the video decoder or the audio decoder. The method can include determining, by the agent, that the one or more measurements of the A/V latency are above a threshold. The method can include determining, by the agent, that the lip-sync status indicates the video and audio data paths are out of sync by at least a threshold.

The method can include configuring, by the agent responsive to the determination, the low latency mode on at least one of a wireless communication module of the client device or an access point connected to the client device. The method can include determining, by the agent based on at least the one or more measurements of the A/V latency and the lip-sync status, to control QoS attributes of WiFi communications. The method can include determining, by the agent based on at least the one or more measurements of the A/V latency and the lip-sync status, to control a rate of output from at least one of the video decoder or the audio decoder.

The method can include configuring, by the agent responsive to the determination, the low latency mode on a broadband access modem (e.g., cable or GPON modem) that is directly or indirectly connected to the client device. The method can include determining, by the agent based on at least the one or more measurements of the A/V latency and the lip-sync status, to control the QoS attributes of broadband access communications.

Configuring the low latency mode on one of the video decoder or the audio decoder can include changing, by the agent, a clock speed of one of the video decoder or the audio decoder. Configuring the low latency mode on one of the video decoder or the audio decoder can include controlling, by the agent, one or more states of a buffer of at least one of the video decoder or the audio decoder.

In another aspect, this disclosure provides a system for latency optimization for cloud applications. The system can include a client device comprising one or more processors and memory, an agent, an audio decoder, and a video decoder. The agent of the client device can monitor video and audio data paths of an application communicating audio/video (A/V) data from one or more servers to the client device. The agent can measure, using the audio decoder and the video decoder, an A/V latency and a lip-sync status of the video and audio data paths of the application. The agent can determine, based on at least the one or more measurements of the A/V latency and the lip-sync status, to enable a low latency mode for at least one of the video decoder or the audio decoder. The agent can configure, responsive to the determination, a low latency mode on one of the video decoder or the audio decoder.

The agent can synchronize, responsive to the determination of the lip-sync status, the video and audio data paths at the client device using one of the video decoder or the audio decoder. The agent can determine that the one or more measurements of the A/V latency are above a threshold. The agent can determine that the lip-sync status indicates the audio and video data paths are out of sync by at least a threshold.

The agent can configure, responsive to the determination, the low latency mode on at least one of a wireless communication module of the client device or an access point connected to the client device. The agent can determine, based on at least the one or more measurements of the A/V latency and the lip-sync status, to control quality-of-service (QoS) attributes of WiFi communications.

The agent can configure, responsive to the determination, the low latency mode on a broadband access modem (e.g., cable or GPON modem) that is directly or indirectly connected to the client device. The agent can determine, based on at least the one or more measurements of the A/V latency and the lip-sync status, to control the QoS attributes of broadband access communications. The agent can determine, based on at least the one or more measurements of the A/V latency and the lip-sync status, to control a rate of output from at least one of the video decoder or the audio decoder.

To configure the low latency mode on one of the video decoder or the audio decoder, the agent can change a clock speed of at least one of the video decoder or the audio decoder. To configure the low latency mode on one of the video decoder or the audio decoder, the agent can control one or more states of a buffer of at least one of the video decoder or the audio decoder.

In yet another aspect, this disclosure is directed to a device for latency optimization for cloud applications. The device can include an audio decoder, a video decoder, and an agent. The agent can monitor video and audio data paths of an application communicating audio/video (A/V) data from one or more servers to the client device. The agent can measure, using the audio decoder and the video decoder, an A/V latency and a lip-sync status of the video and audio data paths of the application. The agent can determine, based on at least the one or more measurements of the A/V latency and the lip-sync status, to enable a low latency mode for at least one of the video decoder or the audio decoder. The agent can configure, responsive to the determination, a low latency mode on one of the video decoder or the audio decoder.

The agent can synchronize, responsive to the determination of the lip-sync status, the video and audio data paths at the client device using one of the video decoder or the audio decoder. The agent can determine that the one or more measurements of the A/V latency are above a threshold. The agent can determine that the lip-sync status indicates the audio and video data paths are out of sync by at least a threshold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2A illustrates a block diagram of embodiments of a computing device, in accordance with one or more embodiments;

Figure 1A:
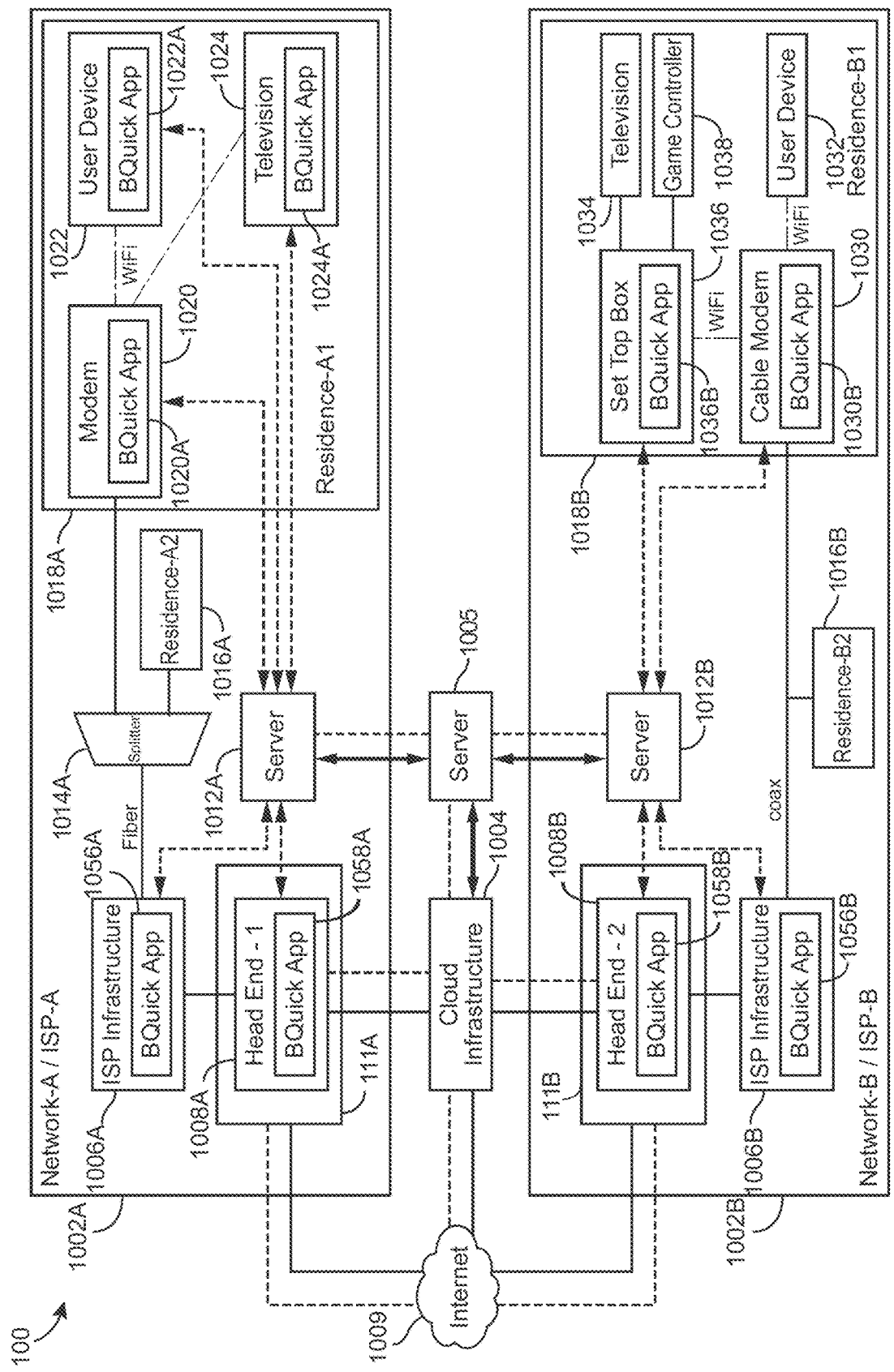
FIG. 1A is a general schematic block diagram of a communication system, in accordance with one or more embodiments.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

The following IEEE standard(s), including any draft versions of such standard(s), are hereby incorporated herein by reference in their entirety and are made part of the present disclosure for all purposes: IEEE 802.11™, IEEE 802.14™, IEEE P802.3™ and IEEE Ethernet standard systems including but not limited to LRM, VSR, SR, MR, LR, ZR and KR. Although this disclosure may reference aspects of these standard(s), the disclosure is in no way limited by these standard(s).

Devices provided by ISPs and customer-owned AR/VR setups, mobile phones, OTT devices, and cloud gaming clients are configured for low latency uses in some embodiments. Some embodiments of systems and methods disclosed herein provide a real time or near real time system to monitor end to end latencies. In some applications, timestamp synchronization with applications at intermediate nodes and end devices use precision time protocol (PTP) synchronization protocols for latency monitoring. In some embodiments, latency is monitored from end-to-end so that latency of all devices within the entire end-to-end process is considered, thereby enabling identification of the origins of substantial latency.

In some embodiments, the systems and methods achieve synchronization of a time reference across all nodes and end-user devices by employing timestamps for low latency data packets at each node. The determination of latency at each node is made by applications at each node. The determination of latency is reported back to a server that communicates with the applications. The systems and methods allow the communication system to distinguish whether latency arises from the home network, an ISP, or cloud servers.

A latency application server extension is integrated into the ISP-provided modem or router in some embodiments. In some embodiments, the server extensions have the ability to filter and transmit all necessary information to the ISP's cloud server or share open data with application developers. The server extension can store or receive information about a customer's low latency plan subscription and can track low latency usages inside the home in some embodiments.

A server extension can refer to a software component or module that extends the functionality of a server application (e.g., a latency application) in some embodiments. Server extensions can be used in various server environments such as web servers, application servers, ISP servers, and database servers to enhance their capabilities or to add specific features tailored to the needs of users or applications and can be installed using extension files. The extensions can be installed on any of the devices discussed herein. In some embodiments, the extensions are provided on an ISP controlled server in the cloud, an ISP controlled modem or access point, a third party Wi-Fi access point, a third party modem, or ISP provided low latency devices.

In some embodiments, the server extension allows a user to select device applications for different latency treatment. A server within the residence can use classifiers and queues to reduce latency for low latency devices. The server can be part of a router, set top box, hub, etc. in some embodiments. The server extensions support multiparty involvement (e.g., cloud managers, ISPs, application developers and silicon vendors) for end to end usages in some embodiments.

With respect to latency, generally, latency refers to an amount of time a system, application or device takes to process and respond to a request in some embodiments. With respect to low latency, low latency refers to such amount of time being within a threshold, a performance level, a user experience level or requirements of the application or usage in some embodiments. The threshold, performance level, user experience level or requirements of the application may vary based on context, such as a type of application and/or use case and the systems, networks, and computer environment for which such use cases and/or application operate or execute. Low latency from a perspective of a computing environment refers to an ability of a computing system or network to provide responses without unacceptable or unsuitable delay, or otherwise minimal delay, for the context or use case of which such responses are provided. System criteria and application parameters can affect a threshold for low latency. The threshold can be fixed or variable (e.g., depending upon conditions or actual needs or requirements at a particular time). With respect to low latency networks and systems in a context of network and network communication, low latency describes a computer network, systems and environment that is designed, configured and/or implemented to support applications, network traffic and processing operations to reduce, improve latency or to meet a low latency threshold. End-to-end latency refers to latency between two points in a network or communication system. The two points can be a source of data and a consumer of data, or intermediate points therebetween in some embodiments.

A low latency device refers to any hardware, device component, or system that has low latency considerations or requirements in some embodiments. A low latency device can be, for instance, a telecommunications, remote control systems, gaming, audio processing, financial trading, augmented reality and/or virtual reality device where delays can impact user experience or system performance. There may be levels of low latency requirements where one low latency device has a more stringent requirement than another low latency device in some embodiments. A low latency path refers to a path for low latency operation in some embodiments. Latency data refers to any indication of latency associated with a communication or configuration data for low latency operation or control in some embodiments. A low latency application refers to the use or performance of a low latency operation in some embodiments. A low latency device or software program can be used to perform the low latency operation (such as video conferencing, cloud gaming, augmented reality/virtual reality (AR/VR) applications, and metaverse applications).

Some embodiments relate to a system including a first device and an application. The application operates on the first device and is configured to append time stamps to a first packet received by the first device. The time stamps indicate a first time the first packet is received by the first device and a second time the first packet is sent by the first device. Append refers to adding or attaching information to a data structure (e.g., a packet) in some embodiments.

In some embodiments, the application is configured to determine latency information associated with communication through the first device using the time stamps. The time stamps include a first time stamp for the first time and a second time stamp for the second time. In some embodiments, the application is configured to provide a second packet including the latency information and communicate the second packet to a server remote from the first device via a virtual communication link. In some embodiments, the first time stamp is an ingress time stamp and the second time stamp is an egress time stamp.

In some embodiments, the time stamps are provided as part of a precision time protocol. In some embodiments, the first packet is for use in a low latency operation. In some embodiments, the time stamps are derived from a satellite time source. In some embodiments, the latency information includes a history of time stamps. In some embodiments, the first device is a user device, cloud infrastructure, internet service provider infrastructure, a set top box, a cable modem, or a wireless router.

Some embodiments relate to a non-transitory computer readable medium having instructions stored thereon that, when executed by a processor, cause a processor to receive a first packet from a first node. The first packet includes latency information associated with a second packet provided to the first node for a low latency application. The instructions also cause the processor to provide a third packet to the first node or other nodes to increase priority for packets for the low latency application if the latency information indicates that a latency threshold for the low latency application has not been met. The first node can be part of a communication system including a cable, fiber optic, or wireless network. The other nodes and the first node are in path associated with the second packet provided to the first node for the low latency application.

In some embodiments, the processor is disposed on a server remote from the first node. In some embodiments, the server is in communication with internet service provider infrastructure and the third packet is provided to the internet service provider infrastructure. In some embodiments, the third packet is provided to internet service provider infrastructure, a set top box, a cable modem, or a wireless router.

In some embodiments, the instructions cause the processor to provide a fourth packet or data unit (e.g., network layer packets, cells, frames, etc., used in the transmission of data) to the first node or the other nodes to decrease priority for packets for the low latency application if the latency information indicates that the latency threshold for the low latency application has been met and additional bandwidth is available.

In some embodiments, the latency information comprises a user identification.

Some embodiments relate to a method of providing low latency service. The method includes providing a first time stamp for a first packet provided to a first device. The first packet can be for reception by a low latency device or as being for use in a low latency operation. The method also includes providing a second packet including latency information to a server remote from the first device via a virtual communication link.

In some embodiments, the method also includes providing a second time stamp for the first packet provided to the first device. In some embodiments, the first time stamp is an ingress time stamp and the second time stamp is an egress time stamp. In some embodiments, the first device includes an application configured to append the first time stamp to the first packet.

Some embodiments relate to a server. The server includes a first application configured to monitor end-to-end latency for a network. The network includes devices. The application is configured to receive latency information from at least one of the devices. The latency information includes time stamps or time period data for a packet to communicate across a device or a link. Monitoring or monitor refers to an action where performance is observed, checked, and/or recorded and can generally occur over a period of time.

A non-transitory computer readable medium has instructions stored thereon that, when executed by a processor, cause the processor to receive a first packet from a first node. The first packet includes latency information associated with a second packet provided to the first node for a low latency application. The instructions also cause the processor to provide a subscription offer in response to the latency information. The first node is part of a communication system comprising a cable, fiber optic, or wireless network. The other nodes and the first node are in paths associated with the second packet provided to the first node for the low latency application.

In some embodiments, the first device is a set top box, a cable modem, or a wireless router. A device can refer to any apparatus, system, or component for performing an operation in some embodiments. A low latency device can refer to any device capable of performing a low latency operation. A low latency operation refers to an operation where higher than low latency operation can affect performance level, user experience level, or a requirement of the application or use in some embodiments. A packet refers to a unit of data that is transmitted over a network in some embodiments, and includes cells, frames, and network layer packets, for instance. The packet can include a header and a payload. Time stamps and latency information can be appended to a packet in some embodiments. Classify or classifying may refer to any operation for determining a classification, grouping or arrangement in some embodiments. For example, a packet can be classified as being for a low latency device or application by reviewing an address, appended data, by its type of data, or other information in some embodiments. Bandwidth may refer to an amount of capacity for communication in some embodiments. Priority refers to a precedence, hierarchical order, level, or other classification in some embodiments. For example, packets can be ordered for transmission in accordance with a priority associated with a latency requirement in some embodiments. A cable, fiber optic, or wireless network refers to any network that uses one or more of a fiber optic cable, a coaxial cable, an ethernet cable, other wire, or wireless medium in some embodiments.

For purposes of reading the description of the various embodiments below, the following descriptions of the sections of the specification and their respective contents may be helpful:

Section A describes a communication system that may be useful for practicing the embodiments described herein.

Section B describes low latency applications that may be useful for practicing the embodiments described herein.

Section C describes embodiments of network environments and computing environments that may be useful for practicing the embodiments described herein.

Section D describes embodiments of systems and methods of latency optimization for cloud applications.

A. Communication System

Network latency can significantly impact internet connectivity, user experience, and the performance of various online applications and services. Some embodiments provide information for ISPs to address end-to-end latency issues through network optimization, infrastructure upgrades, and efficient routing to ensure a reliable and responsive internet experience for their customers. In some embodiments, tools are provided so that cloud servers of ISPs can collect analytics data and can re-configure ISP provided devices like cable modems, GPON modems or set top boxes. In some embodiments, the systems and methods allow multiple parties (e.g., more than one ISP, cloud service providers, public switch operators, and application developers) to address low latency usages including but not limited to video conferencing, augmented reality (AR)/virtual reality (VR), and metaverse end to end usage. In some embodiments, the systems and methods allow multiple parties to cooperate and work together to address latency issues. In some embodiments, the systems and methods can be used with Wi-Fi networks, Ethernet networks, modems, access network, backbone networks, IXPs, and cloud infrastructure and allow multiple teams to work together for latency optimizations across various mediums.

In some embodiments, a latency monitor measures and reports latency for each link, device, and end application. The reports are provided to controllers of the paths, such as, ISPs, application developers, end users, etc. so that actions can be taken once low latency requirements are not met. In some embodiments, systems and methods provide a seamless latency monitoring, analysis, and optimization. The analysis of latency measurements and reporting allows for identification of latency contributors in real time and optimization by mapping traffic requiring low latency traffic to low latency queues or paths. In some embodiments, devices in the path are provided with an application (e.g., software) for effecting monitoring, analysis, and optimization. The analysis of latency measurements and reporting allows for control of devices to appropriately provide low latency traffic to low latency queues or paths. The applications can be in communication with a latency server (e.g., a server for the applications) that coordinates operations and accumulates data according to the monitoring, analysis, and optimization operations. An application or app may refer to a software program or module configured to perform specific functions or tasks on an electronic device.

With reference to FIG. 1A, a communication system 100 includes a network 1002A for residences 1016A and 1018A, a network 1002B for residences 1016B and 1018B, a cloud infrastructure 1004, and a BQUICK_TOP server 1005. Communication system 100 advantageously is configured so that information is provided to ISPs to address latency issues through network optimization, infrastructure upgrades, service upgrades and/or efficient routing to ensure a reliable and responsive internet experience for customers can be achieved on networks 1002A and 1002B. BQUICK_TOP server 1005 is configured to receive the information and address latency issues in some embodiments. BQUICK_TOP server 1005 is in communication (e.g., via direct or virtual connections) with cloud infrastructure 1004 and networks 1002A and B (residences 1016A-B and 1018A-B) to share information, reports, commands, and other data in some embodiments. BQUICK_TOP server 1005, infrastructure 1004 and residences 1016A-B and 1018A-B can utilize any form of communication mediums, networks, protocols, etc. to communicate data and information.

Cloud infrastructure 1004 includes a collection of hardware, software, networking, and other resources that enable the delivery of cloud computing services over the internet in some embodiments. Cloud infrastructure 1004 includes physical servers, storage devices, networking equipment, and other hardware components hosted in data centers distributed across multiple geographic locations in some embodiments. The data centers are equipped with high-performance servers, storage arrays, and networking gear to support the computing needs of cloud services in some embodiments. The cloud infrastructure 1004 is configured to provide high-speed, redundant network links, routers, switches, and content delivery networks (CDNs) for delivery of low-latency, high-bandwidth content for users in some embodiments. Cloud infrastructure 1004 includes block storage (e.g., Amazon EBS, Azure Disk Storage), object storage (e.g., Amazon S3, Google Cloud Storage), and file storage (e.g., Amazon EFS, Azure Files) in some embodiments.

Residences 1016A and 1018A can include a network associated with a first ISP and residences 1016B and 1018B can include a network associated with the same ISP or a second ISP. In some embodiments, the networks for residences 1016A and 1018A and residences 1016B and 1018B are part of broadband access server (BAS) networks. Network 1002A includes infrastructure 1006A, a head end 1008A, a BQUICK ISP_A server 1012A, splitter 1014A, equipment for residence 1016A and equipment for residence 1018A. Equipment for residence 1018A includes an optical network unit (ONU) 1020, a user device 1022, and a television 1024. Modem or optical network unit 1020 can be a fiber optic router, switch, gateway, etc. and have Wi-Fi capabilities for a Wi-Fi network associated with residence 1018A in some embodiments. Optical network unit 1020 is a GPON modem or optical network terminal (ONT) in some embodiments. GPON is a technology that allows for high-speed internet access over fiber optic cables. Optical network unit 1020 converts the optical signals transmitted over the fiber optic cables into electrical signals and/or radio frequency signals that can be used by devices in residence 1018A. Although system 100 is shown communicating via coaxial cable and optical cable, ground based wireless communications and satellite communications can be utilized in system 100. Optical network unit 1020 is generally provided by an optical network operator (ISP-A) and can be referred to as an optical network termination. BQUICK_TOP server 1005 and BQUICK ISP_A server 1012A can be Broadcom Analytics System (BAS Servers) that collect analytics data from various devices like modems, set top boxes, and other devices.

User device 1022 is a smartphone, AR/VR device, tablet, laptop computer, smartwatch, exercise equipment, smart appliance, camera, headphone, automobile, other computing device, etc. Residence 1016A can have similar devices to residence 1018A. Television 1024 and user device 1022 communicate with optical network unit 1020 via a wireless network or wired connections. In some embodiments, optical network unit 1020 can include an Ethernet router including wired connections to user device 1022, wireless modems, and television 1024.

Head end 1008A includes routers, switches, servers, and/or other infrastructure for communicating between ISP infrastructure 1006A and cloud infrastructure 1004. ISP infrastructure 1006A includes routers, switches, servers, and/or other infrastructure for communicating between head end 1008A and splitter 1014A. Splitter 1014A communicates via fiber optic cables between infrastructure 1006A and residences 1016A and 1018A, BQUICK ISP_A 1012A BQUICK_TOP server 1005 communicates with server 1012, infrastructure 1006A, head end 1008A and residences 1016A and 1018A via direct or indirect communication (e.g., via the Internet).

Splitter 1014A is a fiber optic splitter in some embodiments. Splitter 1014A can be used in fiber optic networks to divide an incoming optical signal into multiple separate signals for residences 1016A and 1018A and unify signals into one or more signals for infrastructure 1006A. Splitter 1014A can be configured for a passive optical network (PON) architecture. Bidirectional communication occurs across splitter 1014A in some embodiments. In some embodiments, splitter 1014A is a conducting cable-type splitter (e.g., for a coaxial, not optical cable). Splitter 1014A includes repeaters, amplifiers, signal conditioners, etc. in some embodiments.

BQUICK ISP_A server 1012A is a computing device, such as a machine equipped with one or more processors, memory, and storage drives. BQUICK ISP_A server 1012A delivers assorted services to customers (e.g., residences 1016A and 1018A) for the ISP in some embodiments. BQUICK_TOP server 1005 is configured as a central hub responsible for managing and routing internet traffic for its subscribers. BQUICK ISP_A server 1012A handles requests from users such as accessing websites, sending emails, streaming content, and downloading files. BQUICK ISP_A server 1012A manages network protocols, assigns IP addresses, and facilitates communication between different devices on the internet. BQUICK ISP_A server 1012A includes operating systems like Linux or Windows Server, along with networking software such as routing protocols (e.g., BGP, OSPF), a DNS (Domain Name System) server, a dynamic host configuration protocol (DHCP) server for IP address allocation, and firewall/security software to protect system 100 from cyber threats. BQUICK ISP_A server 1012A employs traffic shaping and quality of service (QoS) mechanisms to prioritize and optimize internet traffic, ensuring a smooth and consistent user experience for all subscribers. These operations can involve managing bandwidth allocation, prioritizing certain types of traffic (e.g., VoIP or video streaming), and mitigating network congestion during peak usage periods and can be performed in response to information from server 1012. BQUICK ISP_A server 1012A employs monitoring tools or applications to continuously analyze traffic data to detect anomalies, troubleshoot network issues, and ensure compliance with service level agreements (SLAs) and regulatory requirements in some embodiments.

BQUICK_TOP server 1005 is a computing device similar to and is configured to communicate with servers 1012A and 1012B. BQUICK_TOP server 1005 includes software advantageously configured to address latency issues through network optimization, infrastructure upgrades, and efficient routing to ensure a reliable and responsive internet experience for their customers in some embodiments. BQUICK_TOP server 1005 can receive logs of network activity, including but not limited to traffic patterns, usage statistics, and security events from servers 1012A and 1012B in some embodiments. BQUICK_TOP server 1005 employs monitoring tools to continuously analyze traffic data to detect anomalies, troubleshoot network issues, and ensure compliance with service level agreements (SLAs) and regulatory requirements in some embodiments. In some embodiments, BQUICK_TOP server 1005 is a platform configured to perform latency monitoring in real time, latency analysis in real time, and latency optimization in real time. In some embodiments, the latency optimization is performed to provide a report indicating latency issues. BQUICK_TOP server 1005 can configure paths in networks 1002A and 1002B and controls devices in networks 1002A and 1002B so that low latency requirements are met in some embodiments.

BQUICK_TOP server 1005 and BQUICK ISP_B server 1012B are similar to BQUICK ISP_A server 1012A and can be configured to operate with residences 1016B and 1018B. Residences 1016A, 1018A, 1016B and 1018B are similar to each other and can include similar devices. Residence 1018B includes a cable modem 1030B, a set top box 1036B, a game controller 1038, a television 1034 and a user device 1032. User device 1032 is similar to user device 1022. Head end 1008B is similar to head end 1008A, and ISP infrastructure 106B is similar to ISP infrastructure 1006A. Televisions 1024 and 1034 are monitors, smart televisions, or other audio/video equipment. Networks 1002A and 1002B can include cameras, security equipment, fire and safety equipment, smart appliances, etc. in communication with infrastructure 1006A and 106B in some embodiments. ISP infrastructure 1006A and 106B can each include fiber optic cable, coaxial cable, remote nodes, splitters, and other equipment for cable customers in some embodiments. The equipment can include amplifiers, remote physical devices or layers and remote media access control devices or layers. Intermediate nodes in ISP infrastructure 1006A and 106B can process data packets and monitor latency and traffic at various points in network. BQUICK_TOP server 1005, BQUICK ISP_B server 1012B, BQUICK_ISP_A server 1012A are controlled by ISPs (e.g., respective ISPs) in some embodiments.

ISP infrastructure 106B is coupled to residences 1016B and 1018B via a coaxial cable in some embodiments. Cable modem 1030B is a device configured to connect devices in residence 1018B to the ISP infrastructure 106B. Cable modem 1030 includes a computer, router, gateway, or other communication device in some embodiments. Modem 1030 can be configured to provide a wireless network for communicating with devices in residence 1018B. Repeaters, amplifiers, signal conditioners, etc. can be provided on the cable associated with modem 1030 in some embodiments. Cable modem refers to any device for communicating across a cable in some embodiments. Optical network unit 1020 and modem 1030 provide data connection to the ISPs data pipe over fiber or cable. All devices inside the home can be connected to the modem over Wi-Fi or Ethernet, for instance, for internet connectivity. Each node (e.g., routers, repeaters, modems, Wi-Fi access points) inside the home can introduce latency. ONU 1020 and modem 1030 can be any device at a home or business that connects networking devices to ISPs via an internet data pipe over coaxial cable, fiber optic cable, digital subscriber line (DSL), or cell connection (e.g., via a tower (e.g., 5G, LTE modem)) in some embodiments.

Set top box 1036 is configured to receive and decode digital television, movie, streaming, or other video signals for viewing on television 1034. Set top box 1036 can be configured for gaming operations and can communicate with a game controller 1038. Set top box 1036 can also be configured to provide internet access, shopping services, home automation, audio features, screen mirroring, etc. Set top box 1036 includes one or more processors, memory, dedicated graphics processing units (GPUs), and/or storage capacity for storing games, applications (apps), latency data, and recorded content in some embodiments. Set top box refers to any device that connects to a television set or monitor and allows users to receive and decode video signals. A set top box can serve as an interface between a television set and various broadcast media sources, such as cable, satellite, or internet-based streaming services in some embodiments. A dashed line in the drawings can represent a virtual connection and a solid line can represent a physical connection (e.g., wires or fiber optic cable).

The cloud infrastructure 1004, head end 1008A, and head end 1008B are in communication with the internet 1009 virtually or directly. Head end 1008A and head end 1008B can be associated with buildings 111A and 111B, respectively. Communication system 100 is generally an end to end combination of networking elements used for networking traffic from a home or business to internet 1009 (e.g., public internet) in some embodiments. In some embodiments, cloud infrastructure 1004 is a set multiple servers, switches, storage units. ISPs can have a pool of data centers/cloud servers co-located with head ends 1008A and 1008B or dedicated links to cloud infrastructure 1004 from head ends 1008A and 1008B and head end connections to the internet 1009.

Although cloud infrastructure 1004 is shown as single block, cloud servers, data servers can be collocated with ISP head ends 1008A and/or 1008B. The cloud servers can be at third party private facility and ISPs can have dedicated physical links or links via internet 1009. Depending on congestion and server processing capabilities, cloud infrastructure 1004 can be a source of latency. Cloud server processing elements can be upgraded to support latency monitor applications (e.g., BQUICK applications) or can configure devices to support low latency services in some embodiments. Head ends 1008A and 1008B can be a central facility (e.g., a central office. A head end refers to a facility where internet data or audio/video content is received, processed, and routed to end subscribers like residential or business owners in some embodiments. Head ends 1008A and 1008B can have multiple switching, routing, data metering, queuing, security elements, and/or other devices which can introduce the latencies. Head ends 1008A and 1008B can also host Cable Modem Termination Systems (CMTS) in a cable network, DSLAM (Digital Subscriber Line Access Multiplexor) in a DSL network, and OLT (Optical Line Terminal) in a fiber network.

Networks 1002A and 1002B are operated by ISP-A and ISP-B. ISPs extend their services to various residences or businesses within communities, cities, or specific regions. Networks 1002A and 1002B represent two distinct networks served by the same or different ISPs, which may be situated in the same neighborhood or entirely in different regions or countries. Homeowners or business proprietors seek out ISPs offering services in their local areas and subscribe to internet service accordingly.

B. Applications

System 100 advantageously includes an ISP infrastructure BQUICK application 1056A for ISP infrastructure 1006A, a head end BQUICK application 1058A for head end 1008A, a modem BQUICK application 1020A for optical network unit 1020, a user device BQUICK application 1022A for user device 1022, and a television BQUICK application 1024A for television 1024. Applications 1056A, 1058A, 1020A, 1022A, and 1024A can be software apps or programs designed to perform specific tasks or provide particular functions as described herein (e.g., latency monitoring, latency analysis, and latency optimization and the communication and storage of data related thereto). Applications 1056A, 1058A, 1020A, 1022A, and 1024A can be provided on any electronic devices in communications system 100 including but not limited to servers, computers, smartphones, tablets, smart devices, appliances, cameras, security devices, vehicles, user devices, and other digital platforms. In some embodiments, applications 1056A, 1058A, 1020A, 1022A, and 1024A can be executed on Windows, macOS, iOS, Android, or other operating systems or can be web-based and accessible through internet browsers. In some embodiments, applications 1056A, 1058A, 1020A, 1022A, and 1024A can be cross-platform with an ability to be executed on multiple OS environments. Applications 1056A, 1058A, 1020A, 1022A, and 1024A can be installed from various sources such as app stores, software repositories, or directly from ISP's website. In some embodiments, applications 1056A, 1058A, 1020A, 1022A, and 1024A are configured to communicate with BQUICK_TOP server 1005 via a virtual connection. In some embodiments, applications 1056A, 1058A, 1020A, 1022A, and 1024A are configured to communicate with BQUICK_TOP server 1005 via BQUICK ISP_A server 1012A. Applications 1056A, 1058A, 1020A, 1022A, and 1024A can be updated through app stores or via automatic updates depending on device settings.

BQUICK applications 1056A, 1058A, 1020A, 1022A, and 1024A are configured to facilitate integration and communication with other services or platforms, sharing of data, collaboration, and/or access to additional functionalities seamlessly. Applications 1056A, 1058A, 1020A, 1022A, and 1024A allow optical network unit 1020, television 1024 and user device 1022 to monitor latency, store subscription information (e.g., classic bandwidth in Megabits per second (MPPS), monitor low latency bandwidth (MBPS), max jitter in milliseconds), and provide options for upgrading internet service. The latency information and subscription information can be tracked according to device, device type, user identification, application, residence identification, etc. in some embodiments. The latency information can be provided in a packet with a time stamp to BQUICK_TOP server 1005 in some embodiments. A user interface can be provided by applications 1056A, 1058A, 1020A, 1022A, and 1024A on optical network unit 1020, television 1024 and user device 1022 to upgrade or downgrade to a different level of service in light of latency information. The different level of service can be provided to latency server 150 and BQUICK_TOP server 1005, BQUICK ISP_A BQUICK server 1012A, or BQUICK ISP_B BQUICK server 1012B in some embodiments.

System 100 advantageously includes an ISP infrastructure BQUICK application 1056B for ISP infrastructure 106B, a head end BQUICK application 1058B associated with head end 1008B, a modem BQUICK application 1030B for modem 1030, and a set top box BQUICK application 1036B for set top box. Applications 1056B, 1058B, 1030B, and 1036B are similar to applications 1056A, 1058A, 1020A, 1022A, and 1024A. In some embodiments, when applications 1030B, 1036B, 1056A, 1056B, 1058B, 1058A, 1020A, 1022A, and 1024A are installed or associated devices join the network, the applications 1030B, 1036B, 1056A, 1056B, 1058B, 1058A, 1020A, 1022A, and 1024A register at server 1012 as being compliant for operations described herein. User device 1032, television 1034, and game controller 1038 can also include an application similar to BQUICK applications 1022A and 1024A.

In some embodiments, BQUICK applications 1030B, 1036B, 1056A, 1056B, 1058B, 1058A, 1020A, 1022A, and 1024A are latency applications and are configured to communicate data so that a topology report can be provided. The topology report identifies devices/networks from end-to-end. Latency requirements of each device is provided in the report (e.g., on a device by device, type of usage by type of usage, user ID by user ID, or application by application basis) in some embodiments. The report can be stored at server 1012 in some embodiments. The latency requirements across the topology can be used to shape traffic, prioritize flow, etc. In some embodiments, the report tracks which devices are offline so that bandwidth reserved for those devices can be used for another device in some embodiments. In some embodiments, the report tracks whether the device is not running a low latency (e.g., BQUICK) application and yet is online so that bandwidth reserved for that device can be used for other devices in some embodiments. Offline refers to a state where a device, system, or application is not actively communicating with other devices or accessing online resources in some embodiments. A device that is off or asleep is offline in some embodiments. A low latency application can be offline when the low latency application is not running in some embodiments.

In some embodiments, the low latency packets are marked so that applications 1030B, and 1036B, 1056A, 1056B, 1058B, 1058A, 1020A, 1022A, and 1024A can process the packets and flow as a low latency flow. In some embodiments, the end device (e.g., application 1024A) can send a command or request indicating that latency requirements are not being met and each application in the path (applications 1020A 1056A, and 1058A) can respond to that command to process the packets for that device at a higher priority or remove traffic from that path in some embodiments. Latency issues can be sourced from an AP, a mesh, a device, or a node. Tracking bit rates or latencies at each location allow solutions to be directed to the particular location of the latency issue.

Figure 1B:
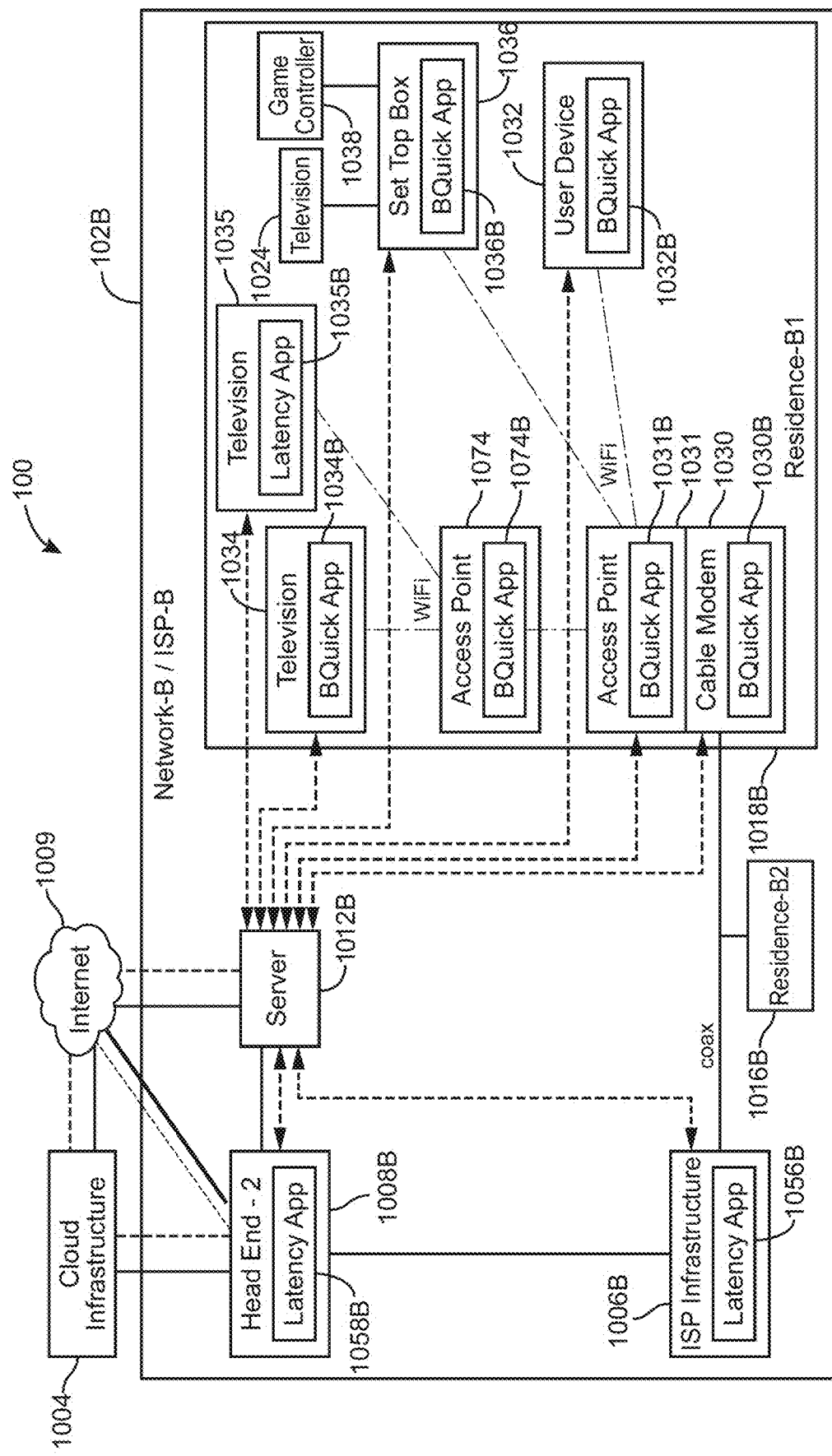
FIG. 1B is a general schematic block diagram of portion of the communication system illustrated in FIG. 1A, in accordance with one or more embodiments.

With reference to FIG. 1B, residence 1018B can include an access point 1031 in communication with modem 1030, a wireless router 1074 in communication with television 1034, a television 1035, set top box 1036, and user device 1032. Access point 1031 can be integrated with modem 1030 or can be a separate unit. User device 1032 includes a user device BQUICK application 1032B, and access point 1031 includes a latency access point application 1031B. Router 1074 includes a wireless router BQUICK application 1074B, television 1034 includes a television BQUICK application 1034B, and television 1035 includes a television BQUICK application 1035B. BQUICK_TOP server 1005, BQUICK_ISP_A server 1012A, and BQUICK_ISP_B server 1012B are in virtual communication with applications 1030B, 1031B, 1036B, 1074B 1032B, 1034B, 1035B, 1056B, and 1058B in some embodiments. A server refers to any computing device that provides services or resources to other computers or clients within a network in some embodiments.

Applications 1030B, 1031B, 1036B, 1074B, 1032B, 1034B, 1035B, 1056B, and 1058B are similar to applications 1056A, 1058A, 1020A, 1022A, and 1024A. Applications 1030B, 1031B, 1036B, 1074B, 1032B, 1034B, 1035B, 1056B, and 1058B allow modem 1030, televisions 1034 and 1035, access point 1031, router 1074, set top box 1036, and user device 1032 as well as other cable modem termination systems to monitor latency, store subscription information (e.g., classic bandwidth in Megabits per second (MPPS), low latency bandwidth (MBPS), max jitter in milliseconds), and provide options for upgrading internet service. A user interface can be provided on optical network unit 1020, television 1024 and user device 1022 to upgrade or downgrade to a different level of service in light of latency information. This ability is available even if the devices are third party devices in some embodiments. In some embodiments, application 1031B or 1074B can be configured to update network topology information to BQUICK TOP server 1012, and applications 1030B, 1031B, 1036B, 1074B, 1032B, 1034B, 1035B, 1056B, and 1058B can monitor low latency resources, request services, register devices, and request different latency treatment (e.g., for video, audio, commands, downloads, etc.). In some embodiments, devices or nodes associated with applications 1030B, 1031B, 1036B, 1074B 1032B, 1034B, 1035B, 1056B, and 1058B can include algorithms for changing packet priority with time and latency requirements. Applications 1030B, 1031B, 1036B, 1074B, 1032B, 1034B, 1035B, 1056B, and 1058B can communicate using virtual or logical connections (e.g., using internet 1009).

Access point 1031 is a networking device that allows Wi-Fi-enabled devices to connect to a wired network. Access point 1031 serves as a bridge between wireless devices, such as wireless router 1074, set top box 1036, user device 1032, televisions 1034 and 1035, and the wired network infrastructure, such as, modem 1030, routers, switches, and servers, in some embodiments. Wireless router 1074 can be a networking device that provides a wireless access point for a wireless network. Wireless router 1074 serves as a hub for a wireless local area network (LAN), allowing multiple devices in or around residence 1018B to connect to the internet and communicate with each other. Wireless router 1074 can include wirelessly built-in Ethernet switches which provide multiple ports for connecting wired devices. A wired connection can connect router 1074 to access point 1031 or modem 1030 in some embodiments. Wireless router refers to any device that provides a wireless access point for a wireless network in some embodiments.

Figure 1C:
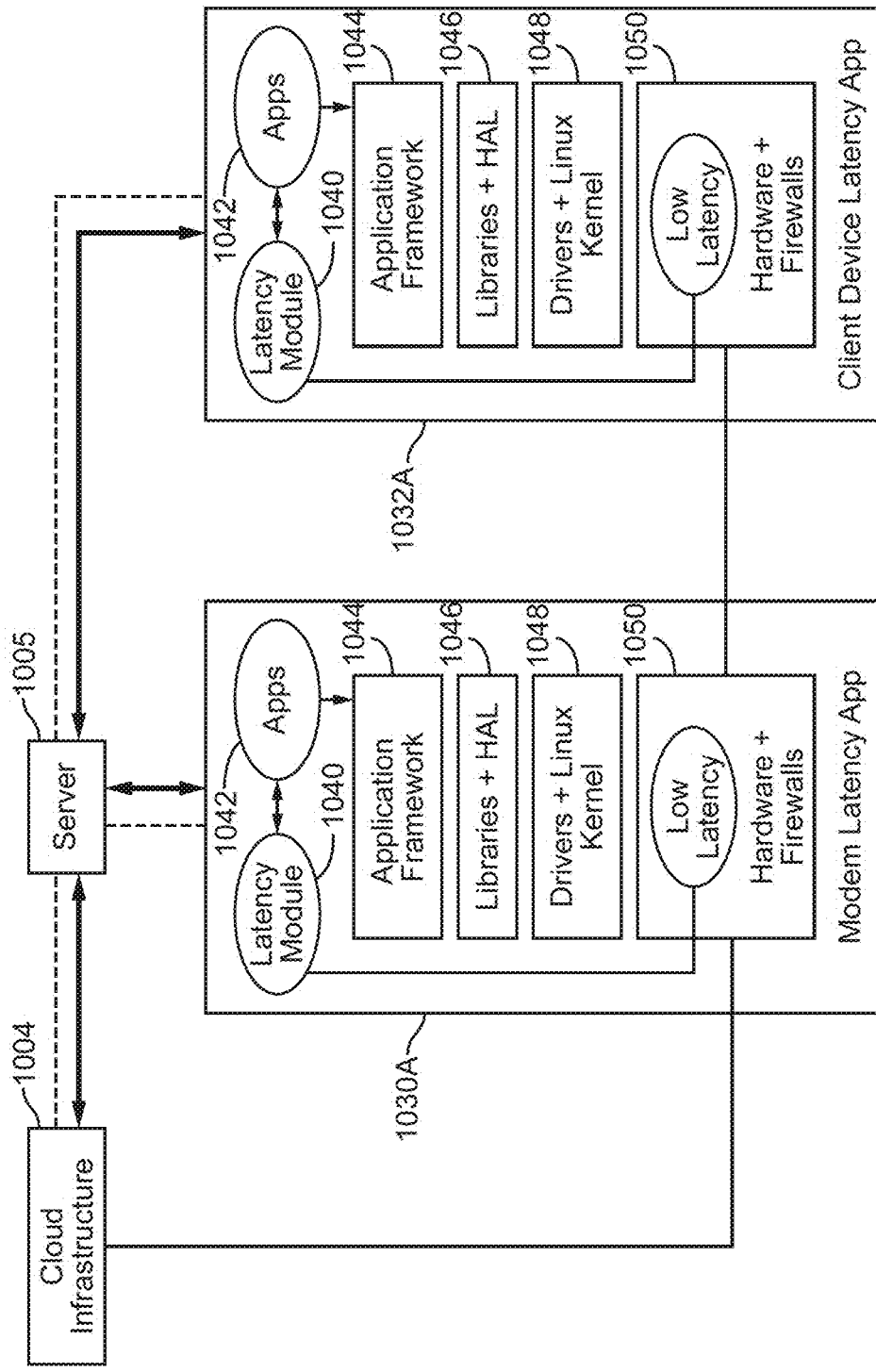
FIG. 1C is a general schematic block diagram of applications in communication with cloud infrastructure for the communication system illustrated in FIG. 1A, in accordance with one or more embodiments.

With reference to FIGS. 1B-1C, applications 1030B and 1032B are in communication with BQUICK_TOP server 1005 via a logical interface. The architecture of applications 1030B and 1032B can be used in any of applications 1031B, 1036B, 1074B 1034B, 1035B, 1056B, 1058B, 1056A, 1058A, 1020A, 1022A, and 1024A. The logical interface is a virtual interface that represents a specific network configuration or functionality within a networking device, such as modem 1030 or user device 1032. The logical interface is software defined and can be created, configured, and managed within the device's operating system in some embodiments. Applications 1030B and 1032B can be provided with modems, routers, access points, mesh devices, set top boxes, AR/VR devices, game consoles, phones, over the top devices (OTTs), etc. Applications 1030B, 1032B, and cloud infrastructure 1004 can communicate using app to app communication. App to app communication is an exchange of data, messages, or commands between two or more software applications running on the same device or different devices over a network in some embodiments. App to app communication enables integration and collaboration between different apps, allowing them to share information, trigger actions, or synchronize state without requiring user intervention in some embodiments. BQUICK_TOP server 1012 can include an application for monitoring and/or determining end to end latency.

In some embodiments, applications 1020A, 1024A, 1032B, 1034B, 1035B, 1036B, and 1032B are client level applications. Applications 1036B can be configured for highest priority (e.g., lowest latency applications) while ordinary streaming latencies are associated with applications 1020A, 1024A, 1032B, 1034B, 1035B, 1032B. Applications 137A and 1031B are node level application and can be configured to provide or assign priority for applications 1020A, 1024A, 1032B, 1034B, 1035B, 1036B, and 1032B (client level applications) and associated devices. Application 1030B can be configured to provide or assign priority between application 1036B, applications 137A and 1031B (e.g., node level applications), and applications 1020A, 1024A, 1032B, 1034B, 1035B, and 1032B (e.g., client level applications) as well as their associated devices. Cloud level applications can include applications 1056B and 1058B in some embodiments. In some embodiments, the partitioning of applications 1056B, 1058B, 1020A, 1024A, 1030B, 1032B, 1034B, 1035B, 1036B, 137A, and 1032B allows for segregation of local and cloud processing, reduction in cloud server communication and ISP bandwidth, local data storage and security, availability of local resources (including edge processing and filtering of information), and faster response to low latency devices. In some embodiments, application 1030B has a server extension and handles communication between server 1012 and applications 1020A, 1024A, 1032B, 1034B, 1035B, 1036B, and 1032B.

When application 1030B includes the server extension, application 1030B can be a client level application or a cloud level application and maintain a virtual connection to server 1012 in some embodiments. The server extensions can provide advantages of decoupling development from ISPs which can be helpful for standardization, of having a direct data path from application 1020A or 1031B to app developer servers, of maintaining local data privacy, of availability of local resources (e.g., local machine learning (ML), edge processing and filtering information), and of faster response to local low latency gadgets or devices in some embodiments.

In some embodiments, applications 1056B, 1058B, 1020A, 1024A, 1030B, 1032B, 1034B, 1035B, 1036B, 137A, and 1032B can achieve synchronization of the time reference across all nodes and end user devices. Applications 1056B, 1058B, 1020A, 1024A, 1030B, 1032B, 1034B, 1035B, 1036B, 137A, and 1032B utilize timestamps for low-latency data packets at each node. This enhancement enables the determination of latency at each node and reporting to server 1012 in some embodiments. By utilizing a precision time protocol (PTP), applications 1056B, 1058B, 1020A, 1024A, 1030B, 1032B, 1034B, 1035B, 1036B, 137A, and 1032B can distinguish whether latency arises from the home network, an ISP, or cloud servers using time stamps in some embodiments. Each device can have an associated PTP clock that communicates with the application associated with the device. The latency per node can be shared across networks so that networks can avoid devices having latency issues or can perform other operations to reduce latency at that node (e.g., divert higher latency traffic away from the node having issues). The PTP clock can be derived form a satellite clock in some embodiments.

With reference to FIG. 1C, applications 1030B and 1032B each include a latency module 1040, applications 1042, an application framework 1044, libraries and hardware abstraction layer 1046, drivers and Linux kernel 1048, and hardware and firewalls 1050. In some embodiments, latency module 1040 is configured to control and monitor hardware and firewalls based upon latency. Latency module or BQUICK module 1040 is software configured to provide the low latency operations described herein. Applications 1042 are apps for performing various operations and can include third party apps (e.g., android package kit (APK)). Application framework 1044 is a structured set of software components that provide the necessary infrastructure for building and running applications.

Libraries and hardware abstraction layer 1046 provides standardized interfaces for device drivers to interact with hardware components. Libraries and hardware abstraction layer 1046 allows applications and system services to access hardware functionalities in a consistent manner across different devices. Libraries and hardware abstraction layer 1046 provide collections of pre-written code that developers can use to perform common tasks or implement specific functionalities and generally contain reusable functions, classes, or modules that provide specific capabilities.

Drivers and Linux kernel 1048 serves as the bridge between the hardware and the software layers of the system, managing system resources in some embodiments. Drivers and Linux kernel 1048 provide essential services and facilitate communication between software processes and hardware devices in some embodiments. Drivers and Linux kernel 1048 includes software components that facilitate communication between the operating system (OS) and hardware devices in some embodiments.

Figure 1D:
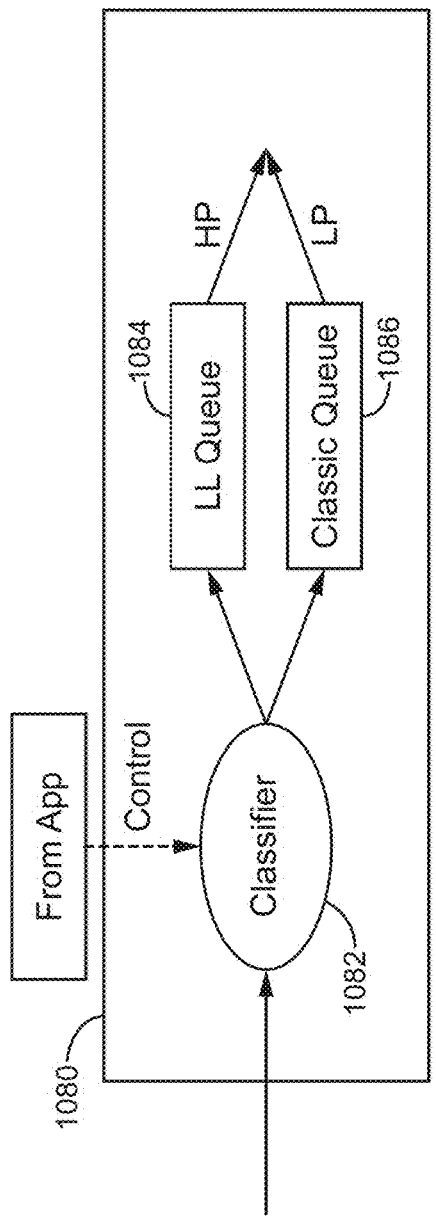
FIG. 1D is a general schematic flow diagram of an operation for the communication system illustrated in FIG. 1A, in accordance with one or more embodiments.

With reference to FIG. 1D, a function, service, process, or operation 1080 can be controlled by any of applications 1030B, 1031B, 1036B, 1074B, 1032B, 1034B, 1035B, 1056B, 1058B, 1056A, 1058A, 1020A, 1022A, and 1024A (FIGS. 1A and 1B). Operation 1080 use a classifier 1082, a low latency queue 1084, and a classic queue 1086. Queues 1084 and 1086 are memory or logical constructs (e.g., implemented using data structures) used to manage the flow of packets or messages within a network device or system 100 (FIG. 1A). Queue 1084 is associated with a high performance path, and queue 1086 is associated with a low performance path in some embodiments. A queue refers to any structure for storing information (e.g., packets) in some embodiments. Any networking device can have separate queue to support low latency traffic and operation can be performed any device in communication system 100 (FIG. 1A). Applications 1030B, 1031B, 1036B, 1074B, 1032B, 1034B, 1035B, 1056B, 1058B, 1056A, 1058A, 1020A, 1022A, and 1024A can report latency for each queue independently.

Queues 1084 and 1086 are configured as first-in-first-out (FIFO) buffers that temporarily hold packets or messages before messages are transmitted or processed in some embodiments. Queue 1084 can store messages for the high performance path (e.g., low latency path), and queue 1086 can store messages for the low performance path (e.g., high latency path) in some embodiments. In some embodiments, a low latency operations may use a low performance path, and a high latency operations may use the high performance path, or each uses the same path. A path refers to any communication route or channel through which data or information travels from a source to a destination (e.g., through devices and across mediums) in some embodiments. A path can include intermediate components and links involved in transmitting data between two or more points in one or more networks in some embodiments. A low latency path refers to a path for low latency traffic in some embodiments.

Classifier 1082 is processor and/or software configured to categorize or classify network traffic based on certain criteria (e.g., by latency requirements and/or priority). Classifier 1082 is configured to enforce network policies, prioritize traffic (e.g., for the high performance or low performance path), and/or apply specific actions based on the classification results in some embodiments. Classifier 1082 is used to differentiate between different classes of traffic (e.g., voice, video, data) and apply QoS policies to ensure that critical applications receive adequate bandwidth and latency requirements. Classifier 1082 prioritizes traffic based on predefined criteria, ensuring that important or time-sensitive applications receive preferential treatment over less critical traffic by appropriately providing traffic to queue 1084 and queue 1086. Classifier 1082 can utilize information about customer subscriptions (e.g., device level, user level, residence level) to classify traffic in some embodiments.

Figure 1E:
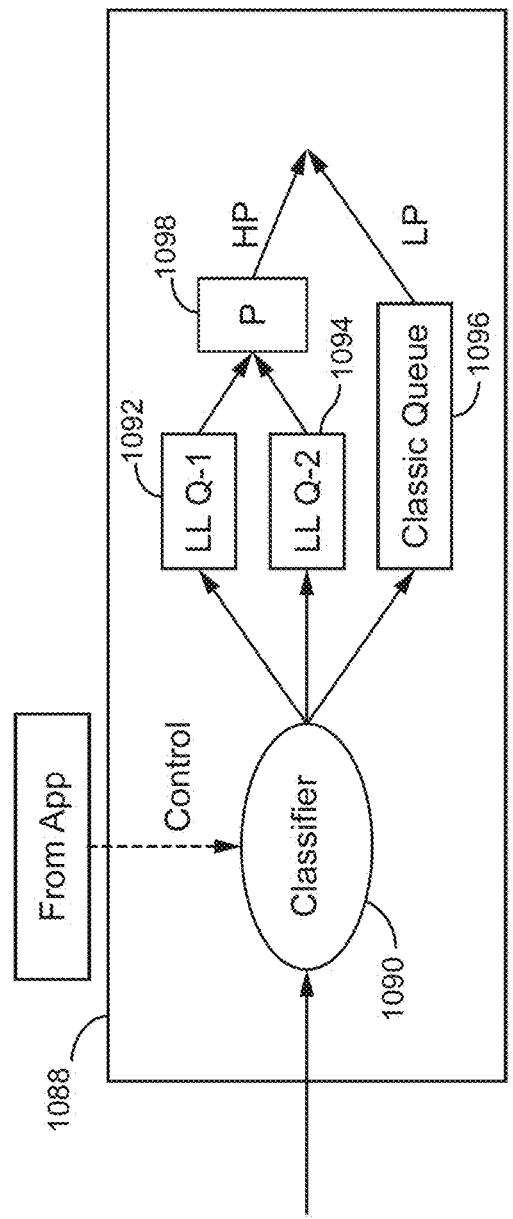
FIG. 1E is a general schematic flow diagram of an operation for the communication system illustrated in FIG. 1A, in accordance with one or more embodiments.

With reference to FIG. 1E, an operation 1088 can be controlled by any of applications 1030B, 1031B, 1036B, 1074B, 1032B, 1034B, 1035B, 1056B, 1058B, 1056A, 1058A, 1020A, 1022A, and 1024A. Operation 1088 is similar to operation 1080 and utilizes a classifier 1090, a first low latency queue 1092, a second low latency queue 1094, a classic queue 1096, and a priority queue 1098. Queues 1092, 1094, 1096 and 1098 are memory or data structures used to manage the flow of packets or messages within a network device or system 100 (FIG. 1A). Queues 1092 and 1094 are associated with a high performance path, and queue 1096 is associated with a low performance path in some embodiments. Queue 1098 receives messages from queues 1092 and 1094 and provides messages or data to the high performance path based upon a priority scheme associated with queues 1092 and 1094 in some embodiments. Classifier 1090 is similar to classifier 1082 and is configured to categorize or classifying network traffic based on certain criteria (e.g., by latency requirements) for queues 1092, 1094, and 1096 in some embodiments. In some embodiments, classifiers 1082 and 1090 are software modules operating on a device (e.g., server, ISP supplied device, user device, etc.). In some embodiments, queues 1084, 1086, 1092, 1094, 1096 and 1098 are virtual queues provided on the memory of the device configured by operation 1080 or 1088. In some embodiments, queues 1084, 1086, 1092, 1094, 1096 and 1098 are dedicated hardware queues (e.g., FIFO memories) on the device. Classifiers 1090 and 1082 and queues 1084, 1086, 1092, 1094, 1096 and 1098 are implemented in an application layer of the device and may utilize services and structures provided by the media access layer and the physical layer in some embodiments. Classifiers 1082 and 1090 can be configured by commands provided by BQUICK TOP server 1012 to appropriately classify low latency traffic in some embodiments.

In some embodiments, applications 1080 and 1088 are configured to operate at nodes associated with devices including but not limited to ONU 1020, modem 1030, set top box 1036, television 1024, access point 1031, user device 1032, and/or router 1074. Applications 1080 and 1088 are configured to control and/or partition subscribed low latency bandwidth traffic (e.g., 20 Mbps vs 50 Mbps), track latency statistics (e.g., minimum, maximum, average latencies for low latency flows), process five tuples (e.g., source IP address, source port, destination IP address, destination port, transport protocol) for X number of flows (where X is any integer) with latency and/or bandwidth requirements, monitor latency introduced by a node, provide timestamps at ingress and egress ports, monitor buffer depths, perform boundary clock precision protocol (e.g., IEEE 10588-2008 standard and extensions thereof), and prioritize traffic among multiple low latency clients. Monitored and measured information can be appended to packets for provision to other nodes and servers (e.g., server 1012). For example, time stamps can be applied to packets at each node or device. Latency can be determined by comparing time stamps. Applications 1080 and 1088 are also configured to track status of low latency applications and provide a user interface for controlling low latency configurations in some embodiments. Classifiers 1082 and 1090 and/or queues 1084, 1086, 1092, 1094, 1096 are configured by applications 1030B, 1031B, 1036B, 1074B, 1032B, 1034B, 1035B, 1056B, 1058B, 1056A, 1058A, 1020A, 1022A, and 1024A (e.g., at each respective node) in some embodiments. In some embodiments, servers 1012, 1012A, and 1012B configure classifiers 1082 and 1090 and/or queues 1084, 1086, 1092, 1094, 1096 via virtual connections.

Applications 1080 and 1088 can identify end to end bandwidth available for low latency applications, provide a user real time feedback of monitored latency, and adjust latency responses. The adjustment may be in response to purchased services or bandwidth upgrades in some embodiments. In some embodiments, applications 1080 and 1088 can be configured to provide an advertisement or customer offer for low latency resources. Applications 1080 and 1088 can address variable latency for each user and adjust responses to the latency level at a particular time, for a particular time period, etc. Latency information can be communicated to servers 1012A, 1012B, and 1012 and applications 1030B, 1031B, 1036B, 1074B, 1032B, 1034B, 1035B, 1056B, 1058B, 1056A, 1058A, 1020A, 1022A, and 1024A as timestamps appended to packets as described herein, or to a packet identifier (e.g., 5 tuples and sequence number) in some embodiments. The time stamp information can be sent to servers 1012A, 1012B, and/or 1012 via an independent virtual/logical channel in some embodiments.

Figure 1F:
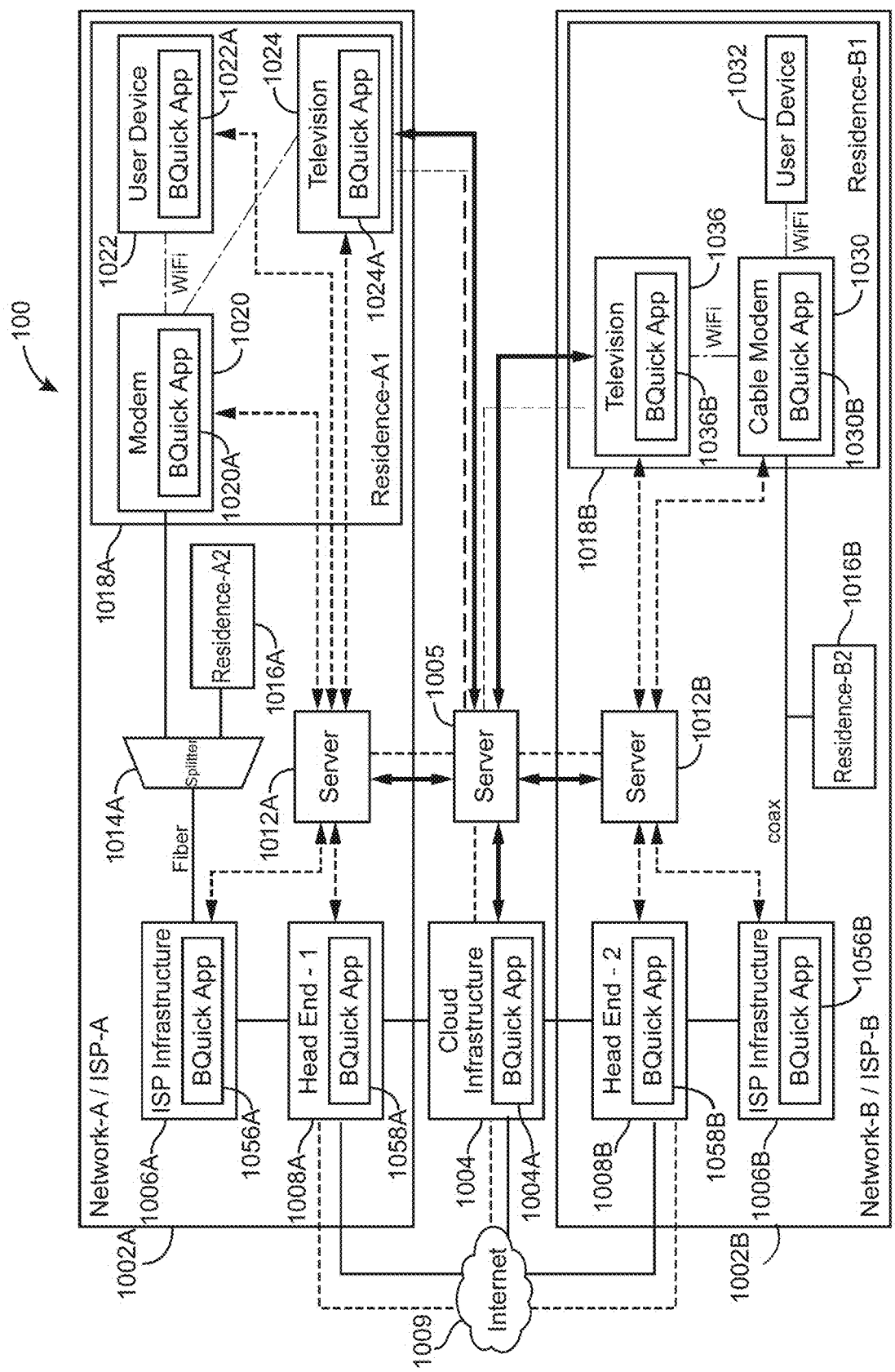
FIG. 1F is a schematic block diagram of the communication system illustrated in FIG. 1A including a server configured for augmented reality/virtual reality and/or metaverse applications, in accordance with one or more embodiments.

With reference to FIG. 1F, cloud infrastructure 1004 can include an application 1004A. Application 1004A is similar to applications 1030B, 1031B, 1036B, 1074B 1032B, 1034B, 1035B, 1056B, and 1058B. BQUICK TOP server 1012 can be configured to monitor AR/VR applications and/or metaverse applications. An application executed on BQUICK TOP server 1012 can perform the monitoring functions. Application 1004A is in communication with BQUICK TOP server 1012. Servers 1012A and 1012B can include an application similar to application 1004A.

Using applications 1020A, 1024A, 1030B, 1032B, 1034B, 1035B, 1036B, 137A, and 1032B, the devices given by ISPs, customer-owned AR/VR setups, mobile phones, over the top (OTT) devices, and cloud gaming clients are capable of facilitating low latency uses. Applications, 1020A, 1024A, 1030B, 1032B, 1034B, 1035B, 1036B, 137A, and 1032B allow devices in residences 1018A and 1018B to interact with the server extension integrated in the ONU 1020 and modems 1030 or routers (e.g., ISP provided). Additionally, the server extensions have the ability to filter and transmit all necessary information to servers 1012A and 1012B or share open data with application developers.

C. Computing Environment

Prior to discussing the specifics of embodiments of the systems and methods of the present solution, it may be helpful to discuss the computing environments in which such embodiments may be deployed.

As shown in FIG. 2A, computer 2001 may include one or more processors 2003, volatile memory 2022 (e.g., random access memory (RAM)), non-volatile memory 2028 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 2023, one or more communications interfaces 2018, and communication bus 2050. User interface 2023 may include graphical user interface (GUI) 2024 (e.g., a touchscreen, a display, etc.) and one or more input/output (I/O) devices 2026 (e.g., a mouse, a keyboard, a microphone, one or more speakers, one or more cameras, one or more biometric scanners, one or more environmental sensors, one or more accelerometers, a remote control, a video game controller, or joystick, etc.). Non-volatile memory 2028 stores operating system 2015, one or more applications 2016, and data 2017 such that, for example, computer instructions of operating system 2015 and/or applications 2016 are executed by processor(s) 2003 out of volatile memory 2022. In some embodiments, volatile memory 2022 may include one or more types of RAM and/or a cache memory that may offer a faster response time than a main memory. Data may be entered using an input device of GUI 2024 or received from I/O device(s) 2026. Various elements of computer 2001 may communicate via one or more communication buses, shown as communication bus 2050.

Computer 2001, as shown in FIG. 2A, is shown merely as an example. Clients, servers, intermediary devices, and other networking devices may be implemented by any computing or processing environment and with any type of machine or set of machines that may have suitable hardware and/or software capable of operating, as described herein. Processor(s) 2003 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 2018 may include one or more interfaces to enable computer 2001 to access a computer network such as a Local Area Network (LAN), a Wide Area Network (WAN), a Personal Area Network (PAN), or the Internet through a variety of wired and/or wireless or cellular connections.

In some implementations, the computing device 2001 may execute an application on behalf of a user of a client computing device. For example, the computing device 2001 may execute a virtual machine, which provides an execution session within which applications execute on behalf of a user or a client computing device, such as a hosted desktop session. The computing device 2001 may also execute a terminal services session to provide a hosted desktop environment. The computing device 2001 may provide access to a computing environment including one or more of: one or more applications, one or more desktop applications, and one or more desktop sessions in which one or more applications may execute.

Figure 2B:
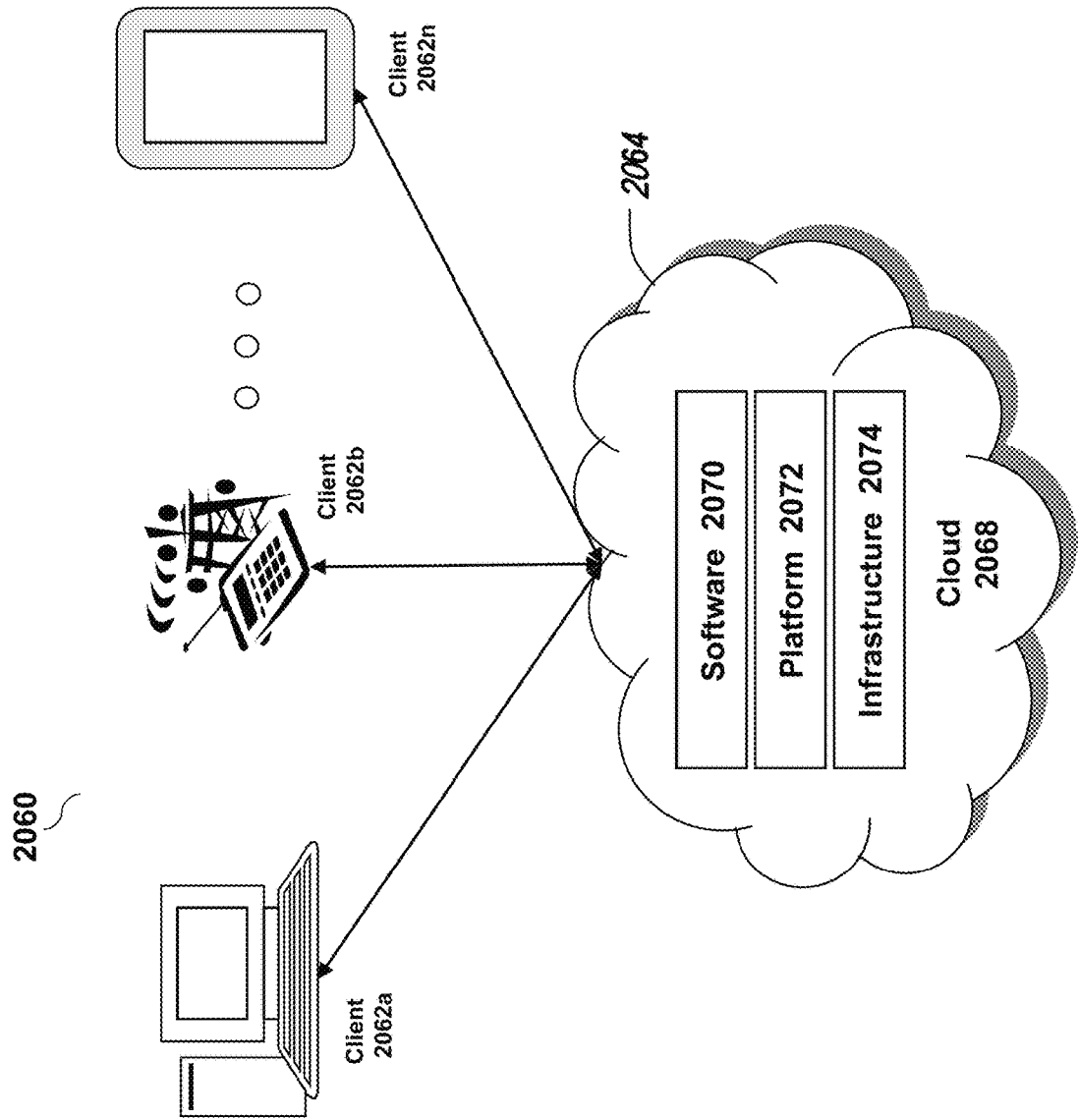
FIG. 2B illustrates a block diagram depicting a computing environment comprising a client device in communication with cloud service providers, in accordance with one or more embodiments.

Referring to FIG. 2B, a computing environment 2060 is depicted. Computing environment 2060 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 2060 can provide the delivery of shared services (e.g., computer services) and shared resources (e.g., computer resources) to multiple users. For example, the computing environment 2060 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 2060 may provide client 2062 with one or more resources provided by a network environment. The computing environment 2062 may include one or more clients 2062a-2062n, in communication with a cloud 2068 over one or more networks 2064. Clients 2062 may include, e.g., thick clients, thin clients, and zero clients. The cloud 108 may include back end platforms, e.g., servers 106, storage, server farms or data centers. The clients 2062 can be the same as or substantially similar to computer 2001 of FIG. 2A.

The users or clients 2062 can correspond to a single organization or multiple organizations. For example, the computing environment 2060 can include a private cloud serving a single organization (e.g., enterprise cloud). The computing environment 2060 can include a community cloud or public cloud serving multiple organizations. In some embodiments, the computing environment 2060 can include a hybrid cloud that is a combination of a public cloud and a private cloud. For example, the cloud 108 may be public, private, or hybrid. Public clouds 108 may include public servers that are maintained by third parties to the clients 2062 or the owners of the clients 2062. The servers may be located off-site in remote geographical locations as disclosed above or otherwise. Public clouds 2068 may be connected to the servers over a public network 2064. Private clouds 2068 may include private servers that are physically maintained by clients 2062 or owners of clients 2062. Private clouds 2068 may be connected to the servers over a private network 2064. Hybrid clouds 2068 may include both the private and public networks 2064 and servers.

The cloud 2068 may include back end platforms, e.g., servers, storage, server farms or data centers. For example, the cloud 2068 can include or correspond to a server or system remote from one or more clients 2062 to provide third party control over a pool of shared services and resources. The computing environment 2060 can provide resource pooling to serve multiple users via clients 2062 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 2060 can provide on-demand self-service to unilaterally provision computing capabilities (e.g., server time, network storage) across a network for multiple clients 2062. The computing environment 2060 can provide an elasticity to dynamically scale out or scale in responsive to different demands from one or more clients 2062. In some embodiments, the computing environment 2060 can include or provide monitoring services to monitor, control and/or generate reports corresponding to the provided shared services and resources.

In some embodiments, the computing environment 2060 can include and provide different types of cloud computing services. For example, the computing environment 2060 can include infrastructure as a service (IaaS). The computing environment 2060 can include platform as a service (PaaS). The computing environment 2060 can include serverless computing. The computing environment 2060 can include software as a service (SaaS). For example, the cloud 2068 may also include a cloud based delivery, e.g., software as a service (SaaS) 2070, platform as a service (PaaS) 2072, and infrastructure as a service (IaaS) 2074. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, google compute engine provided by Google Inc. of Mountain View, California, or RIGHTSCALE provided by Right Scale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 2062 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 2062 may access PaaS resources with different PaaS interfaces. Some PaaS interfaces use HTTP packages, standard Java APIs, Java Mail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 2062 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 2062 may also access SaaS resources through smartphone or tablet applications, including, e.g., Salesforce Sales Cloud, or Google Drive app. Clients 2062 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Although examples of communications systems described above may include devices operating according to an Ethernet and other standards, it should be understood that embodiments of the systems and methods described can operate according to alternative standards and use various wireless communication devices. For example, multiple-unit communication interfaces associated with cellular networks, satellite communications, vehicle communication networks, wired networks, and networks can utilize the systems and methods described herein without departing from the scope of the systems and methods described herein.

D. Systems and Methods for Latency Optimization for Cloud Applications

Below are detailed descriptions of various concepts related to, and embodiments of, techniques, approaches, methods, apparatuses, and systems for latency optimization for cloud applications. The various concepts introduced above and discussed in greater detail below may be implemented in any of numerous ways, as the described concepts are not limited to any particular manner of implementation. Examples of specific embodiments and applications are provided primarily for illustrative purposes.

It should be noted that certain passages of this disclosure may reference terms such as "first" and "second" in connection with devices, modes of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected (which may refer to electronic or communicative coupling or connection, such as for the purposes of data transmission) include indirect and direct couplings and connections.

In certain network environments, devices can execute one or more applications to facilitate communication or exchange of data between other devices within a network. Some applications (e.g., cloud applications) can allow for communication between at least one device (e.g., client device) and a cloud device (e.g., remote devices), while other applications can allow for peer-to-peer communication (e.g., communication between client devices). By executing these applications, the devices can transmit or receive data, share information, or perform various tasks across the network.

The executable applications can facilitate a range of interactions between the devices within the network, including file sharing, data uploads or downloads, streaming data, or other types of data communication. Some applications may be considered latency-sensitive applications, while others may be considered non-latency-sensitive applications. For instance, low latency (or latency-sensitive) applications can refer to any application configured to deliver data or receive responses with reduced or minimized delay or latency. Examples of low latency applications can include those providing various latency-sensitive functionalities, such as but not limited to teleconference, video or audio stream, gaming, or virtual simulations, to name a few. In another example, non-low latency (or latency-insensitive) applications can refer to or be any application that does not prioritize real-time interactions or may tolerate relatively longer delays between the devices. Examples of non-low latency applications can include non-latency-sensitive functionalities such as but not limited to email, document editing software, application platforms (e.g., platforms deploying AR/VR), file sharing, or file storage. For purposes of providing examples herein, the application executable by the devices can be latency-sensitive applications (e.g., low latency applications) or non-latency-sensitive applications (e.g., non-low latency applications).

In various environments, systems and methods discussed herein may activate low latency mode to configure one or more components or hardware of at least one device for low latency applications. Configuring the components of the device for low latency applications can minimize data propagation, transmission, processing, or queuing delays or latency for the low latency applications. However, in certain scenarios, the data communication latency of low latency applications may be within a latency threshold (e.g., an acceptable level of latency) without activating the latency mode. In such cases, configuring the least one device to the low latency mode (for the entire duration of executing the low latency application) may consume excessive resources, increase power usage (e.g., power inefficient), or increase the burden on the hardware. The systems and methods of the technical solution discussed herein can perform latency and lip-sync measurements to optimize latency for various applications while minimizing resource consumption (including power usage) and decreasing load on the hardware.

The systems and methods can monitor the execution of applications on the one or more devices. For instance, the systems and methods can monitor the execution of a low latency application on a device. Responsive to detecting the low latency application, the systems and methods can perform latency and lip-sync measurements. Latency measurement can include measuring a link latency via enabling low latency data over cable service interface specification (DOCSIS) (LLD) for the DOCSIS link. Latency measurement can include measuring audio/video (A/V) latency, such as end-to-end latency, delays in receiving audio data and video data, etc. Lip-sync measurement can involve comparing the presentation time stamps (PTSs) in respective frames of the audio data to the corresponding PTSs of the video data.

The systems and methods can analyze the measurement output and the A/V output data to determine whether the latency is at or above a predefined threshold. If the latency is below the predefined threshold, the systems and methods can continue measuring the latency or lip-sync, e.g., periodically, aperiodically, or continuously. Otherwise, if the latency is at or above the predefined threshold, the systems and methods can configure the one or more components of the device (or other network devices) in low latency mode. Configuring the component(s) can include configuring at least one of a video decoder or an audio decoder of the device to execute at a relatively higher frequency or clock rate, thereby processing the audio or video data faster, configuring at least one data path for low latency path, or configuring other components (e.g., Wi-Fi, Bluetooth (BT), cable, GPON), or high-definition multimedia interface (HDMI)) in the low latency mode to facilitate or support communication of latency-sensitive data packets.

The systems and methods can monitor the link latency status periodically (e.g., 1 minute, 5 minutes, or 10 minutes) to determine whether to disable the low latency mode. If the link latency is below the predefined latency threshold, the systems and methods may disable the low latency mode. In some cases, the systems and methods may detect that the low latency application has been suspended or closed. In such cases, the systems and methods can disable the low latency mode. Disabling the low latency model can involve the systems and methods configuring the component(s) of the device (or other network devices) to exit the low latency mode. Hence, by activating or disabling the low latency mode according to the latency status, the systems and methods of the technical solution discussed herein can minimize resource consumption or power usage, reduce burden or load on the hardware of the devices, and improve latency for applications.

Figure 3:
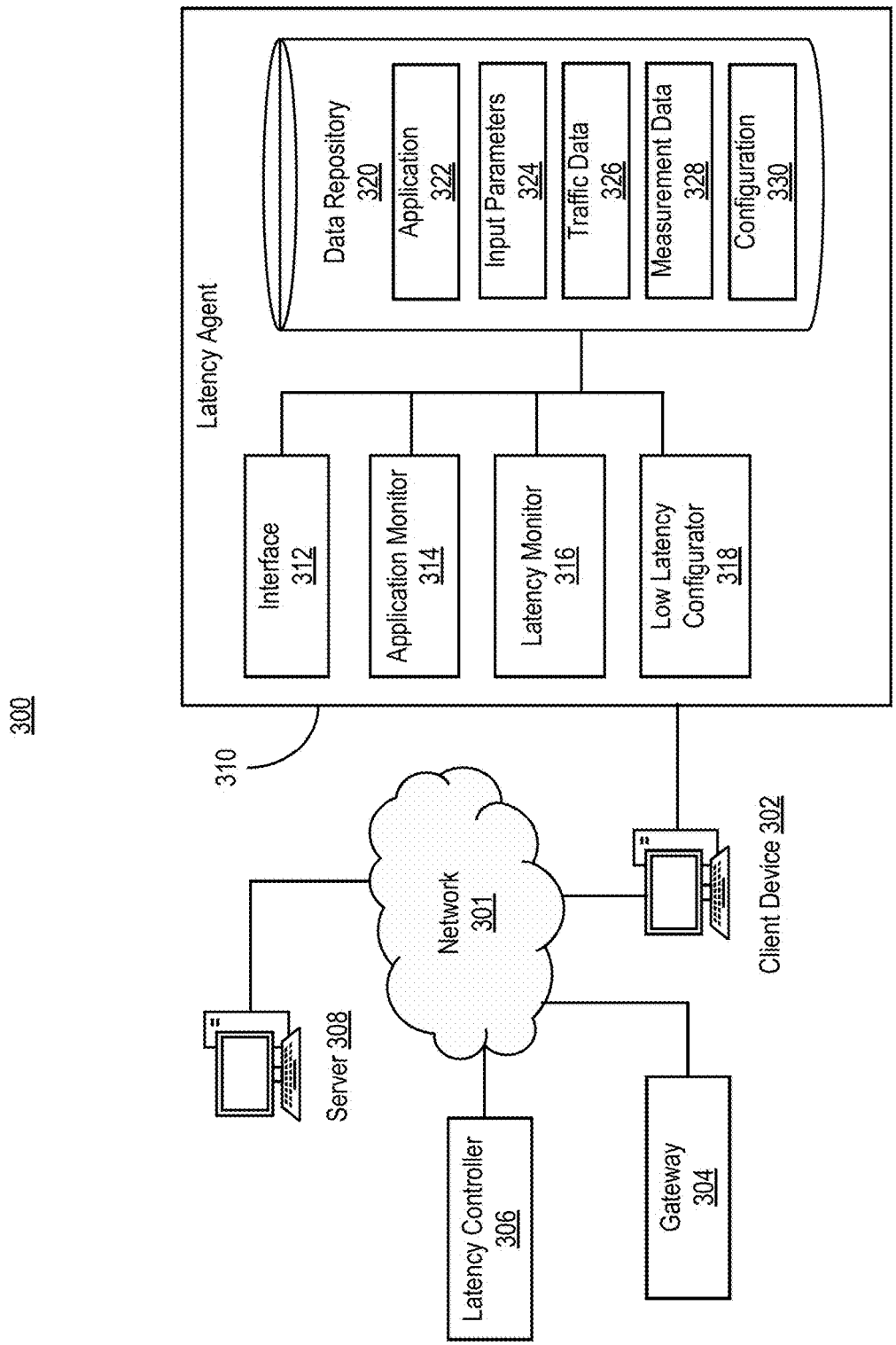
FIG. 3 is a block diagram of an example system to optimize latency for cloud applications, in accordance with one or more implementations.

FIG. 3 depicts a block diagram of one embodiment of a system 300 to optimize latency for cloud applications. The system 300 can include at least one network 301, at least one client device 302, at least one gateway 304, at least one latency controller 306, and at least one server 308. These elements can be referred to generally as one or more components, elements, entities, or devices of the system 300. The system 300 can utilize the features and functionalities of one or more components to perform at least one of monitoring network data flows (e.g., sometimes referred to generally as flows) or data packets, processing data packets, obtaining packet information, determining whether individual flows of packets are from low latency service flow pipe or classic service flow pipe, monitoring execution of applications, measuring latency (e.g., path latency or A/V latency), measuring lip-sync, providing low latency services, configuring one or more devices in low latency mode, or performing low latency management, to name a few. Each component can receive, transmit, or otherwise communicate information with other components of the system 300 via the network 301. Other devices or components can be included within the system 300, not limited to those discussed herein. It should be noted that the one or more devices of the system 300 can communicate with other devices not limited to those discussed herein. The client device 302 can include a latency agent 310. Although not shown, other devices (e.g., the gateway 304) within the system 300 may include a latency agent with similar features or functionalities as the latency agent 310.

In some implementations, one or more components of the system 300 can include, correspond to, or be in communication with one or more components of the communication system 100, as described in conjunction with at least one of FIGS. 1A-F. For example, the client device 302 can include or correspond to at least one of the user device 1022, 1032, television 1024, 1034, game controller 1038, etc. The gateway 304 can include or correspond to at least one of modem 1020, cable modem 1030, etc. The latency controller 306 can include, correspond to, or be a part of at least one of the server 1005, 1012A, or 1012B. The server 308 can include, correspond to, or be a part of the cloud infrastructure 1004. The latency agent 310 can include, correspond to, or be part of at least one of the applications 1030B, 1036B, 1056A, 1056B, 1058A, 1058B, 1020A, 1022A, and 1024A.

In some implementations, the one or more components of the system 300 can correspond to or include one or more components of the computer 2001, as described in conjunction with at least one of FIGS. 1A-2B. For example, the client device 302, the gateway 304, the latency controller 306, or the server 308 may include at least one of the processor(s) 2003, the communication interface(s) 2018, the user interface 2023, etc. In another example, the client device 302 may include or correspond to at least one of the one or more clients 2062a-2062n. The server 308 may include or correspond to the cloud 2068.

In some examples, the one or more components (e.g., client device 302, gateway 304, or server 308) of the system 300 can include or be installed with a latency application. The latency application included at least one of the latency applications 1004A, 1056A, 1056B, 1058A, 1058B, etc., such as described in conjunction with FIGS. 1A-F. The latency application can refer to an agent (e.g., latency agent 310) of the component or device. The latency application executing on a device of the system 300 may provide one or more features or functionalities similar to the latency application of another device of the system 300. In some cases, the latency application executing on one device of the system 300 may provide one or more features or functionalities different from the latency application of another device of the system 300, for example.

The one or more components (e.g., client device 302, gateway 304, latency controller 306, server 308, or latency agent 310) discussed herein can include or be implemented in hardware, or a combination of hardware and software, in one or more embodiments. Each component of the system 300 may be implemented using hardware or a combination of hardware or software detailed above in connection with at least one of FIGS. 1A-F and 2A-B. For instance, each of these components can include any application, program, library, script, task, service, process, or any type and form of executable instructions executing on the hardware of the respective component to perform the features, functionalities, or operations discussed herein. The hardware includes circuitry such as one or more processors in one or more embodiments.

The network 301 can include computer networks such as the Internet, local, wide, metro or other area networks, intranets, satellite networks, other computer networks such as voice or data mobile phone communication networks, and combinations thereof. The components of the system 300 can communicate with each other via the network 301, for example, the client device 302 can communicate with at least one of the gateway 304, the latency controller 306, or the server 308. The network 301 may be any form of computer network that can relay information between the network devices or components within the system 300, amongst others. In some implementations, the network 301 may include the Internet and/or other types of data networks, such as a local area network (LAN), a wide area network (WAN), a cellular network, a satellite network, or other types of data networks. The network 301 may also include any number of computing devices (e.g., computers, servers, routers, network switches, etc.) that are configured to receive and/or transmit data within the network 301. The network 301 may further include any number of hardwired and/or wireless connections. Any or all of the computing devices described herein (e.g., client device 302, gateway 304, latency controller 306, server 308, etc.) may communicate wirelessly (e.g., via WiFi, cellular, radio, etc.) with a transceiver that is hardwired (e.g., via a fiber optic cable, a CAT5 cable, etc.) to other computing devices in the network 301. Any or all of the computing devices described herein (e.g., client device 302, gateway 304, latency controller 306, server 308, etc.) may also communicate wirelessly with the computing devices of the network 301 via a proxy device (e.g., a router, network switch, or gateway), for instance, the client device 302 can communicate wirelessly with the latency controller 306 or the server 308 via the gateway 304. In some cases, the network 301 may include one or more hardwired connections between a number of components within the system 300, such as between the client device 302 and the gateway 304.

The system 300 can include one or more client devices 302 communicatively coupled to the network 301. The client device 302 may sometimes be referred to as a data processing system. Each of the client devices 302 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The one or more client devices 302 can include or correspond to one or more computing devices or network devices that can perform various functions as described herein. The one or more client devices 302 can include any or all of the components and perform any or all of the functions of at least one of the user/client devices 1022, 1032, 2062 described herein in conjunction with at least one of but not limited to FIGS. 1A-2B. In some cases, the one or more client devices 302 may include or correspond to the user/client devices 1022, 1032, 2062, such as described in conjunction with at least one of FIGS. 1A-2B. The one or more client devices 302 may include other devices associated with a residence, such as the television 1024, 1034, set top box 1036, game controller 1038, or other devices of at least one residence 1018A, 1018B described in conjunction with at least one of FIGS. 1A-F. Each residence 1016A, 1016B, 1018A, 1018B can represent a local network of respective one or more client devices 302, such that the wireless connection of the one or more client devices 302 can be managed or provided by the respective modem (or cable modem) 1020, 1030 (or the latency application 1020A, 1030A of the respective modem 1020, 1030) of the local network.

Each client device 302 can include, but is not limited to, a television device, a mobile device, smart phone, personal computer, a laptop, a gaming device, a kiosk, or any other type of computing device. Each client device 302 can be implemented using hardware or a combination of software and hardware. Each client device 302 can include or be installed with one or more applications, which can allow an operator or user of the device to perform application-specific tasks, such as sending messages, accessing websites, streaming audio or video content, executing VR/AR simulations, etc.

The one or more applications can refer to software programs executable on the client device 302. The one or more applications can be managed or hosted by a third-party entity or a remote device, such as by the server 308. The one or more applications may be executed by the respective client device 302 to establish a communication session or allow the exchange of data with one or more network devices via the network 301, e.g., communication with the latency controller 306, the server 308, among other components of the system 300.

The application executed by the client device 302 can be a low latency application or other types of application. Low latency applications can refer to any application configured to deliver data or receive responses with reduced or minimized delay or latency. When executing the low latency applications on the client device 302, the end-user (e.g., operator of the client device 302) may expect to receive real-time data or response with reduced or minimized delay or latency. Low latency applications may sometimes be referred to as latency-sensitive applications. Examples of low latency applications can include those providing various latency-sensitive functionalities, such as but not limited to teleconference, video or audio stream, gaming, or virtual simulations, to name a few. Other types of applications, e.g., non-low latency applications, can refer to or be any application that does not prioritize real-time interactions or may tolerate relatively longer delays between the client device 302 and the server 308 (or other remote devices). Examples of non-low latency applications can include non-latency-sensitive functionalities such as but not limited to email, document editing software, social media platforms, or file storage. For purposes of providing examples herein, the application executed by the client device 302 can be a low latency application or a non-low latency application. In the context of DOCSIS, for example, flows of packets for the low latency application can be communicated via a low latency service flow pipe (e.g., in low latency mode) and flows of packets for the non-low latency application can be communicated via a classic service flow pipe.

Each client device 302 can include a display device that can provide visual information, such as but not limited to at least one of information related to one or more applications executed or available on the client device 302, information representing measurement results (e.g., latency measurement or lip-sync measurement), latency mode status (e.g., whether the latency mode is enabled or disabled), or other types of information discussed herein. The display device can include a liquid-crystal display (LCD) device, an organic light-emitting diode (OLED) display, a light-emitting diode (LED) display, a bi-stable display (e.g., e-ink, etc.), amongst others. The display device can present one or more user interfaces to on various regions of the display in accordance with the implementations described herein. In some implementations, the display device can include interactive elements, such as a capacitive or resistive touch sensors. Thus, the display device can be an interactive display (e.g., a touchscreen, a display, etc.), and can include one or more input/output (I/O) devices or interfaces. Each client device 302 can further include or be in communication with (e.g., via a communications bus coupled to the processors of the client devices 302, etc.) one or more input devices, such as a mouse, a keyboard, or digital keypad, among others. The display can be used to present one or more applications as described herein, such as web browsers, emails, social network applications, video or audio streams, VR or AR simulations, gaming applications, etc. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 302. The interactions can result in interaction data, which can be stored and transmitted by the processing circuitry of the client device 302 to other computing devices, such as those in communication with the client devices 302. The interaction data can include, for example, interaction coordinates, an interaction type (e.g., click, swipe, scroll, tap, etc.), and an indication of an actionable object with which the interaction occurred. Thus, each client device 302 can allow/enable a user to interact with and/or select one or more actionable objects presented as part of graphical user interfaces to carry out various functionalities as described herein.

Figure 4:
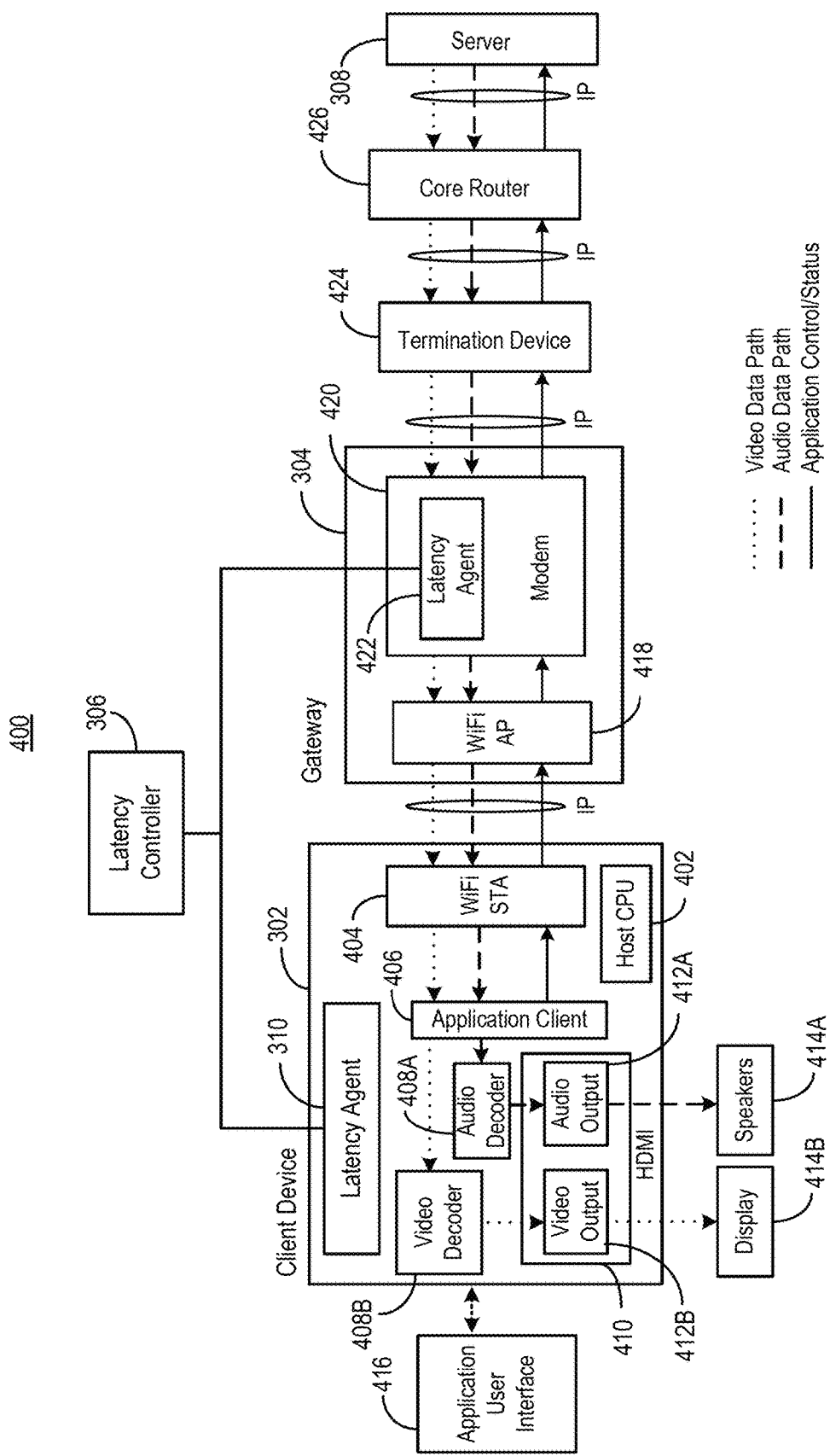
FIG. 4 is a block diagram of example video and audio data paths, in accordance with one or more implementations.

The client device 302 can include one or more components to perform wired or wireless communication and facilitate low latency communication (e.g., operate in low latency mode), such as described in conjunction with at least FIG. 4. For example, the client device 302 can include at least one of a WiFi station (STA) (e.g., 404), an application client (e.g., 406), one or more decoders (e.g., audio decoder 408A or video decoder 408B), a digital interface such as HDMI including one or more outputs (e.g., audio output 412A or video output 412B), the latency agent 310, etc. The client device 302 can be coupled to one or more external devices, such as at least one audio device (e.g., speakers 414A), at least one display device (e.g., display 414B), or at least one interface (e.g., application user interface 416), among others. The client device 302 can include or be communicatively coupled to other components or devices not limited to those discussed herein.

The system 300 can include at least one gateway 304. The gateway 304 can sometimes be referred to as a broadband access gateway. The gateway 304 can include or correspond to a networking device configured to provide wireless communication for wireless communication devices (e.g., the client devices 302) to connect to a wired network (e.g., connection to a cable modem) using WiFi technology. The gateway 304 can be communicatively coupled to the client device 302 via a wired or wireless connection. The gateway 304 may be an intermediary device configured to facilitate the connection or communication between the client device 302 and other devices or components within the network 301 (e.g., local network or external network), such as communication with the server 308, remote data repository, or other data sources.

The gateway 304 can include one or more components to support the wireless communication between the client device 302 and other network devices (e.g., the server 308) and facilitate low latency communication (e.g., operation in low latency mode). For example, the gateway 304 can include at least one WiFi access point (AP) (e.g., 418), at least one modem (e.g., 420), and a latency agent (e.g., 422). The latency agent of the gateway 304 can include or perform one or more features or functionalities similar to the latency agent 310 of the client device 302. The latency agent of the gateway 304 can correspond to a latency application installed on the gateway 304, which can include features or functionalities of at least one of the latency applications 1056A, 1056B, 1058A, 1058B, 1020A, 1020B, etc., such as described in conjunction with at least one of FIGS. 1A-F, for example. In some cases, the gateway 304 can include but are not limited to at least one of WiFi router, mesh WiFi system, wireless range extender or repeater, wireless bridge, WiFi-enabled network switch, hotspot device, etc. The one or more components of the gateway 304 can be described in conjunction with at least FIG. 4. The gateway 304 can include other components not limited to those described herein.

The gateway 304 can receive a request for wireless connection from the client device 302. The gateway 304 can receive the request from an application (e.g., low latency application or non-low latency application) executing on the client device 302. In some cases, the gateway 304 can grant or deny the request in response to performing at least one suitable authentication technique (e.g., confirm username, password, device ID, or other form of identification of the client device 302). In response to granting the request, the gateway 304 can establish at least one communication session or channel between the client device 302 and another device. For purposes of providing examples herein, the gateway 304 can establish a communication channel between the client device 302 and the server 308, although it should be noted that the communication channel can be between the client device 302 and other devices, not limited to the server 308.

In some cases, the gateway 304 can forward the request to the server 308 to establish the communication channel. In such cases, the communication channel can be established in response to an acknowledgment from the server 308 approving the request. The gateway 304 can assign an IP address to the client device 302 authenticated to connect to the network 301. The gateway 304 can manage network traffic exchange between the client device 302 and external devices. For example, the gateway 304 can forward or relay data traffic from the client device 302 (e.g., as a source device) to a destination device. In another example, the gateway 304 can relay information from an external source device to the client device 302 (e.g., as the destination device). The gateway 304 can include various security features (e.g., firewall protection or authentication services) to filter traffic from potential malicious sources or filter malicious data. The gateway 304 can provide services, such as but not limited to at least one of domain name resolution (DNS), dynamic host configuration protocol (DHCP) for automatic IP address allocation, virtual private network (VPN) support for secure remote access, etc. The gateway 304 can provide other features or functionalities to support low latency communication for the client device 302, not limited to those discussed herein.

The system 300 can include at least one latency controller 306. The latency controller 306 can be a computing device, including one or more processors and memory. The latency controller 306 can be composed of hardware, software, or a combination of hardware and software components. In some implementations, the latency controller 306 can include, correspond to, or be a part of the server 1005 (e.g., the latency server), such as described in conjunction with at least one of FIGS. 1A-F. In this case, the latency controller 306 can be communicatively coupled to at least one of the client device 302 or the gateway 304. The latency controller 306 can communicate with the client device 302 via the latency agent 310. The latency controller 306 can communicate with the gateway 304 via another latency agent (e.g., 422). The latency controller 306 can communicate with other devices installed with a respective latency agent (or latency application). For purposes of providing examples, the latency controller 306 can transmit or receive network traffic to or from the respective latency agent (e.g., 310 or 422).

In some arrangements, the latency controller 306 can communicate with the latency agent 310 via one or more intermediary devices. The latency controller 306 can process or analyze information from one or more latency agents. The latency controller 306 can determine whether to operate one or more devices in low latency mode based on information from the one or more latency agents. The latency controller 306 can provide instructions to one or more latency agents to configure one or more components of the respective devices in low latency mode. Configuring the component(s) in low latency mode can refer to configuring the operations or settings of one or more components to support latency-sensitive traffic, e.g., allowing prioritization of the latency-sensitive traffic, increasing data processing for faster outputs, etc. In the low latency mode, the respective device (e.g., the client device 302 or the gateway 304) can manage data communication for low latency applications or real-time applications.

For example, the latency controller 306 may receive an indication of the client device 302 executing a low latency application from the latency agent 310. The latency controller 306 can instruct or trigger the latency agent 310 to perform latency measurements. The latency measurements can include at least one of path latency measurement (e.g., multi-hop latencies), A/V latency measurement, or lip-sync measurement, as non-limiting examples. The latency measurement and/or lip-sync measurement (e.g., lip-sync status) can be performed via, at, or using one or more components of the client device 302 or other devices within the system 300, such as using an audio decoder and/or video decoder of the client device 302, e.g., delay or synchronization of A/V data received or processed at the decoders. The latency controller 306 can receive the measurements from the latency agent 310. The latency controller 306 can analyze the measurements to determine whether the latency is within an acceptable level. The acceptable latency level can be predefined by an operator of the client device 302 or an administrator of the latency controller 306, for example. In some cases, the acceptable latency level may be based on or defined by the executed application. The latency controller 306 can enable low latency mode by instructing the latency agent 310 to configure one or more components of the client device 302 in the low latency mode. In some cases, the latency controller 306 can disable the low latency mode by instructing the latency agent 310 to exit the low latency mode. Exiting the low latency mode may involve or include reverting the configurations of the one or more components of the client device 302 or configuring the one or more components of the client device 302 to normal operating mode. In some cases, the latency controller 306 can disable the low latency mode in response to receiving an indication from the latency agent 310 that the low latency application is suspended. In some other cases, the latency controller 306 can disable the low latency mode based on the latency measurements from the latency agent 310 being within the acceptable level.

Figure 5:
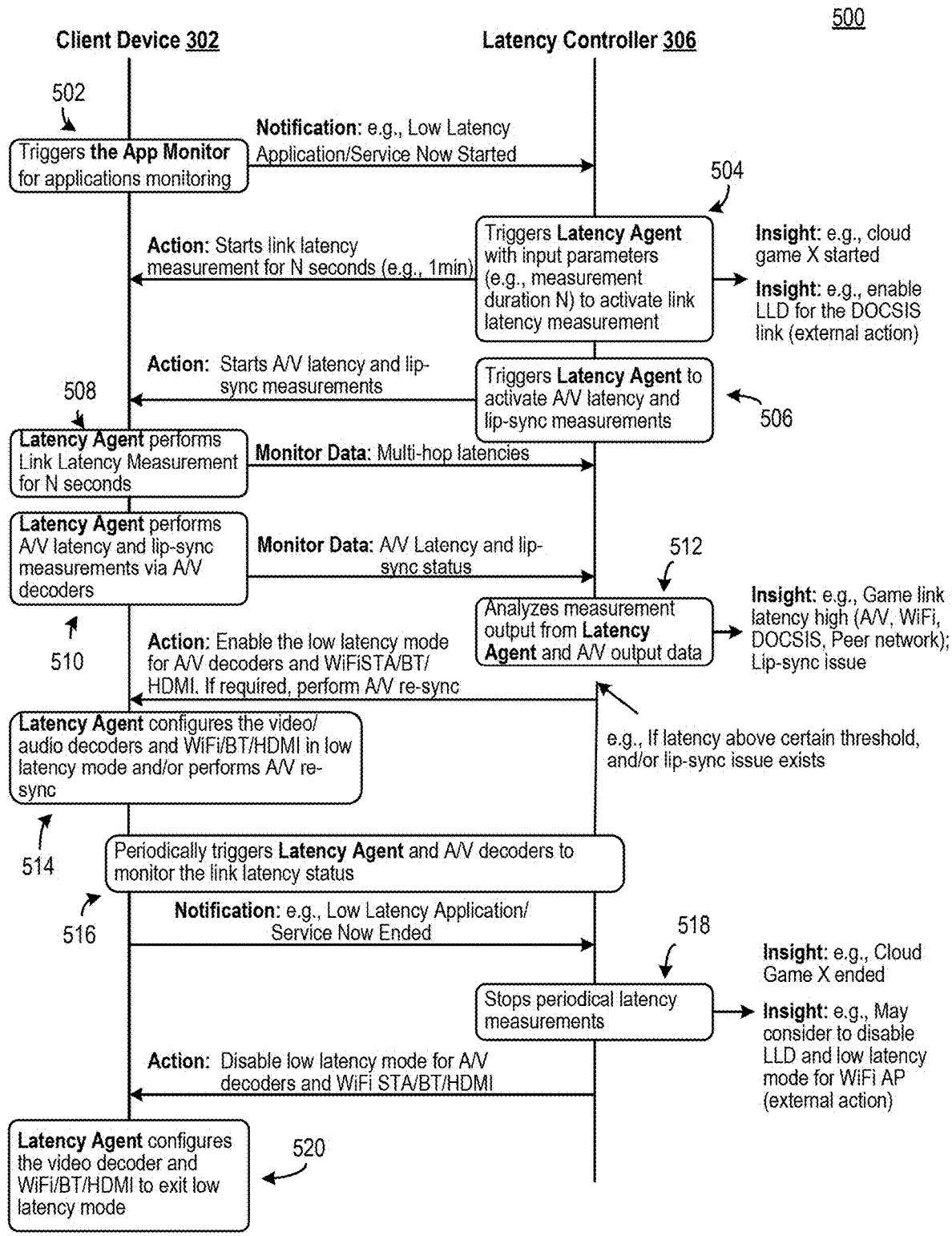
FIG. 5 is an example flow diagram of the communication between a client device and a latency controller, in accordance with one or more implementations.

The operation of the latency controller 306 can be described in conjunction with at least one of but not limited to FIGS. 4-5. The latency controller 306 can perform other operations to manage the low latency mode or operations of the low latency mode, not limited to those discussed herein. It should be noted that the latency controller 306 may communicate with one or more latency agents (or latency applications) installed on other devices to perform similar or related features or functionalities. For instance, the latency controller 306 can communicate or exchange information with the latency agent (e.g., 422) of the gateway 304, such that at least the gateway 304 can provide latency measurements to the latency controller 306 and the latency controller 306 can determine whether to enable or disable low latency mode for one or more components of the gateway 304.

The system 300 can include at least one server 308. The server 308 can include at least one processor and a memory. The server 308 can be referred to as a cloud service, a cloud storage service, a third-party resource provider, or a resource distributor. The server 308 can include any or all of the components and perform any or all of the functions of at least the cloud infrastructure 1004 described herein in conjunction with at least one of but not limited to FIGS. 1A-F. In some cases, the server 308 may correspond to at least the cloud infrastructure 1004, such as described in conjunction with at least one of FIGS. 1A-F.

For example, the server 308 can include a collection of hardware, software, networking, and other resources that allow the delivery of cloud computing services over the internet in some embodiments. The server 308 can include physical servers, storage devices, networking equipment, and other hardware components hosted in data centers distributed across multiple geographic locations in some embodiments. The server 308 can be configured to provide high-speed, redundant network links, routers, switches, and content delivery networks (CDNs) for the delivery of low-latency, high-bandwidth content for users in some embodiments. The server 308 can include block storage (e.g., Amazon EBS, Azure Disk Storage), object storage (e.g., Amazon S3, Google Cloud Storage), and file storage (e.g., Amazon EFS, Azure Files) in some embodiments.

In some implementations, the server 308 can include a remote data storage configured to store information or provide services for one or more devices within the network 301, such as for the server 308, the client device 302, etc. The server 308 may provide access to the remote data storage for the server 308. The server 308 can be communicatively coupled to the one or more devices within the network 301. The server 308 can communicate with the client device 302 through at least the gateway 304, among other network devices intermediate between the server 308 and the client device 302.

The server 308 can include, store, or maintain the resources associated with (or for) the one or more applications executed on the client device 302 (or other client devices). The resources can include application data, e.g., data related to the operation of the executed application on the client device 302. The application data can include, but is not limited to, at least one of user profiles, application settings, content libraries, or other operational information associated with the application. For example, the client device 302 can launch an application (e.g., low latency application) to request application data from at least the server 308, or other servers. The server 308 can receive the request to access or retrieve the application data from the client device 302. The server 308 may verify the authentication credentials of the client device 302 (or user of the client device 302) to determine whether the client device 302 is authorized to access the application data. In response to a successful verification, the server 308 can transmit the requested application data to the client device 302.

The server 308 can be referred to as a source of the data for the application executed on the client device 302. The client device 302 can execute or launch an application to communicate and access information from the server 308. In some cases, the client device 302 can execute the application to communicate or access information from multiple servers, not limited to the server 308. In such cases, the server 308 can store at least a portion of the application data and one or more other servers can store the remaining portion of the application data. The client device 302 (or the application executing on the client device 302) can receive the application data from multiple sources.

The client device 302 can include or be communicatively coupled to a latency agent 310. The latency agent 310 can be composed of hardware, software, or a combination of hardware and software components. For instance, the latency agent 310 can be a processing unit of the client device 302 and/or a program executing on the client device 302. The latency agent 310 can correspond to or be a part of a latency application of the client device 302. The latency agent 310 can be coupled to or in communication with one or more components of the client device 302, such as but not limited to the A/V decoders (e.g., 408A or 408B), the application client (e.g., 406), WiFi STA (e.g., 404), etc. The latency agent 310 can be granted access to control, provide instruction to, or configure one or more components of the client device 302.

The latency agent 310 can include one or more components for managing latency for low latency applications. Managing latency can include operations such as detecting the execution of applications, performing latency or lip-sync measurements, or configuring one or more components of the client device 302 in low latency mode (e.g., prioritize or increase processing speed for latency-sensitive traffic), among others. For example, the latency agent 310 can include an interface 312, an application monitor 314, a latency monitor 316, a low latency configurator 318, and a data repository 320. The components of the latency agent 310 may be combined into a single component. In some cases, at least one of the components of the latency agent 310 can be separated into multiple components. The latency agent 310 may include more or less components not limited to those discussed herein.

In some implementations, one or more operations of the latency agent 310 may be performed by the latency controller 306. In some implementations, the latency agent 310 can perform the operations discussed herein in response to receiving a corresponding instruction from the latency controller 306, such as an instruction to perform latency measurement, an instruction to configure the component(s) of the client device 302, etc. In some cases, the latency agent 310 may delegate one or more tasks or operations to other components of the client device 302 or other devices within the network 301, for example.

The latency agent 310 can include an interface 312. The interface 312 can transfer data between one or more components of the latency agent 310, such as application monitor 314, latency monitor 316, low latency configurator 318, and data repository 320. The interface 312 can exchange data between the components of the latency agent 310 and the components of the client device 302. The interface 312 can include hardware, software, or a combination of hardware and software components to interface with the network 301, devices within the system 300 (e.g., gateway 304, latency controller 306, or server 308), or components of the latency agent 310. The interface 312 can include features and functionalities similar to the communication interface 2018 to interface with the aforementioned components, such as in conjunction with FIG. 2A. For example, the interface 312 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 312 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 312 can communicate with one or more aforementioned components to at least receive, transmit, or otherwise exchange data/information. The interface 312 can interact with other components or devices not limited to those discussed herein.

In various implementations, the interface 312 can transfer data or information received from various devices or components of the system 300 or the client device 302 for storage in the data repository 320. The interface 312 can retrieve data from the data repository 320 and provide the retrieved data to authorized devices requesting the data. For purposes of providing examples, communication to or from the components of the latency agent 310 can be performed via the interface 312.

The latency agent 310 can include an application monitor 314. The application monitor 314 may sometimes be referred to as a monitoring agent or tool. The application monitor 314 can collect information from the client device 302 to determine the execution of applications on the client device 302. In some cases, the application monitor 314 can receive information from at least one of an application client (e.g., 406), an application user interface (e.g., 416), or other components of the client device 302 that create process(es) for at least one application or handle application-related events (e.g., execution or termination events).

For example, the application monitor 314 can receive process creation or termination event information from the application client or other monitoring components on the client device 302. The process creation information can include details or data associated with the initiation of a new process in an operating system of the client device 302, such as at least one of process identifier (ID), process name, executable path, priority class, process state (e.g., running or suspended), environmental variables, etc., being created. In response to receiving the process creation information, the application monitor 314 can detect an execution or launch of an application. In some cases, the application monitor 314 can detect an activation of a software application (e.g., graphic processing unit (GPU) software) indicative of a launch of a low latency application. In response to the detection, the application monitor 314 can determine that the launched application is a low latency application.

The termination event information can include details on at least one process being terminated in the operating system. The termination event can include details similar to the process creation information, such as at least one of the process ID, process name, executable path, etc., being terminated. In response to receiving the termination event information, the application monitor 314 can determine that a respective application is (being) terminated. In some cases, the application monitor 314 may receive suspension event information from the application client indicating an application (or at least one process) being suspended.

It should be noted that the application monitor 314 may receive information indicative of the launch, suspension, or termination of the applications from other components of the client device 302, not limited to the application client. In some implementations, the application monitor 314 may receive an indication of a launch, suspension, or termination of the application from the corresponding server 308 providing application resources to the client device 302.

The application monitor 314 can determine the type of application launched or executed on the client device 302 based on details associated with the launched application or process. For example, the latency agent 310 can include or store a predefined application list including a list of process information of low latency applications, e.g., process ID, process name, etc., associated with low latency applications. Each process associated with a respective low latency application can correspond to an index, a value, a row, or a column in the application list. The application monitor 314 can map the created or executed process to processes included in the predefined application list. If the process is included in the application list, the application monitor 314 can determine that the launched application is a low latency application. Otherwise, the application monitor 314 can determine that the launched application is a non-low latency application.

In some implementations, the application list may include a list of processes associated with non-low latency applications. In this case, if the created process of an application is mapped to an index in the list, the application monitor 314 may determine that the launched application is a non-low latency application. Otherwise, the application monitor 314 can determine that the launched application is a low latency application if the created process is not included in this application list, for example. In some configurations, the application list may include details associated with low latency and non-low latency applications.

In some cases, the application monitor 314 may receive or retrieve metadata information associated with the executable file of the application. The metadata can include at least one of company name, product name, or description of the application, among other information for classification of the application. In such cases, the application monitor 314 can analyze the metadata of the application to determine the type of application.

In some implementations, the application monitor 314 can monitor the network traffic to or from the executed application to determine the type of application. For example, each packet of the network traffic can include 4-tuple (e.g., source and destination IP address and source and destination port number) or 5-tuple (e.g., source and destination IP address, source and destination port number, and protocol type). The application list can include tuple information associated with low latency applications. In such cases, the application monitor 314 can map (or compare) the tuple information from the traffic of the application to determine the type of application. The application list may be updated or configured by the user of the client device 302 or the administrator of the latency controller 306, for example.

In another example, at least one of the packets to or from the application may include a flag indicative of a low latency application. In this case, the application monitor 314 can determine the type of application based on whether at least one of the packets from the application traffic includes the flag. The application monitor 314 can determine the type of application based on other information associated with the application, not limited to the information or operations discussed herein.

The application monitor 314 can provide a notification or a message to the latency controller 306. The notification can include event information (e.g., an application launched, suspended, or terminated), information associated with the application launched (e.g., processes, metadata, or application type, to name a few), or services that started (or ended). In some aspects, the application monitor 314 may forward information collected from the client device 302 to the latency controller 306 for the latency controller 306 to determine whether the launched application is a low latency application.

The latency agent 310 can include a latency monitor 316 (e.g., sometimes referred to as latency and lip-sync monitor 316 or generally as monitor 316). The latency monitor 316 can perform latency measurements including at least one of path latency, A/V latency measurement, lip-sync measurement, etc. In some cases, the latency monitor 316 can perform latency measurement in response to receiving an instruction or a trigger from the latency controller 306. For example, the latency agent 310 (e.g., application monitor 314) can notify the latency controller 306 of an executed low latency application. The latency monitor 316 can receive input parameters from the latency controller 306 after the notification. The latency monitor 316 can use the input parameters to conduct the latency measurements, for example.

In some cases, the latency monitor 316 can perform latency measurement in response to detecting a launch of a low latency application. For instance, the input parameters may be predefined or pre-configured and stored in the data repository 320. In such cases, the latency monitor 316 can retrieve and use the input parameters to conduct the latency measurements. The input parameters can include at least one of a duration to perform path latency measurement, types of latency to measure, number of data points to send to the latency controller 306 for analysis, a type of (statistical) metric (e.g., average, median, minimum value, or maximum value), or other parameters relevant to performing the latency monitoring or measurement. In some cases, the input parameters can include frequency or intervals to upload the latency measurement to the latency monitor 316 or the latency measurement duration for each interval.

For purposes of providing examples, the input parameters can include a monitoring duration (e.g., during for measuring the path latency) and a frequency for monitoring latency (e.g., sometimes referred to as measurement or monitoring frequency) to account for changes in the network condition during application usage. The measurement frequency may correspond to the frequency of uploading measurements to the latency controller 306. The latency monitor 316 can store the measurements discussed herein in the data repository 320 or other data storage.

To measure the path latency, the latency monitor 316 may execute a network diagnostic tool or perform features similar to the network diagnostic tool to track or identify the data packet path of the low latency application from end to end. The data packet path can refer to the route taken by the data packets traveling from a source to a destination, such as from the client device 302 to the server 308 or the server 308 to the client device 302. Based on the path taken by the data packets, the latency monitor 316 can measure the latency or obtain latency measurement at each hop from one network node to another. A network node can refer to a physical or virtual device within the network configured to create, receive, or transmit data. The client device 302 or the server 308 can be a network node at the end of the transmission path. The result from tracking the data packet path (e.g., path tracing) can include at least a route map or a network topology. For purposes of providing examples, one or more network nodes (e.g., intermediary devices) can be intermediate between the client device 302 to the server 308.

For example, the latency monitor 316 can measure the latency between the transmission and reception of data packets from a first network node to a second network, from the second network node to a third network node, etc., until the data packets arrive at the server 308 from the client device 302 or at the client device 302 from the server 308. In this case, the path latency may be referred to as a multi-hop latency or hop-by-hop latency. The result from performing the latency measurement can include hop delay or other performance monitoring metrics. The latency monitor 316 may perform other path latency measurements, such as but not limited to at least one of round-trip time (RTT), propagation delay, queueing latency, etc. In some cases, the latency monitor 316 can obtain other information from performing the latency measurement or executing the network diagnostic tool, such as fault detection, network health, etc.

In various implementations, the latency monitor 316 can perform the path latency measurement for a predefined duration according to the input parameter from the latency controller 306. For the measurement duration, the latency monitor 316 can aggregate the results, such as obtaining an average, maximum value, or minimum value, etc. After the measurement duration, the latency monitor 316 can send the measurement results to the latency controller 306. In some cases, the latency monitor 316 can send the measurement results in response to perform each path latency measurement.

The A/V latency can refer to the time delay experienced by the A/V data as it travels across the network 301 from the source to the destination, e.g., from at least the server 308 to the client device 302 in this case. The A/V latency may indicate the delay between the transmission and/or processing of at least one or both of audio and/or video signals traversed from the server 308 to the client device 302 via the respective audio data path and/or video data path, respectively. The latency may be influenced by one or more factors, such as signal encoding and decoding time, buffering time, network transmission latency, processing delays within one or more devices, etc. In some cases, the A/V latency measurement can include latency measurement of each of the audio stream and/or video stream as it traverses through various devices within the network 301, for instance, from the server 308 or other servers to the client device 302, or vice versa, where one or more of the network devices, as well as the network (or connection) in between, may cause delay or latency.

The latency monitor 316 can perform A/V latency measurement by identifying data packets associated with at least one of audio data or video data and determining the time delay from the transmission of the audio data or the video data from the server 308 to the reception of the audio data or the video data by the client device 302. The latency monitor 316 can identify data packets that include audio data or video data based on at least one of header fields (e.g., payload type, IP address, port number, protocol identifier, or marker bits), embed metadata, or other packet information.

In some cases, the A/V latency can refer to the time delay of processing the A/V data received from the server 308. The latency monitor 316 can measure or determine the processing time delay of the A/V data via the A/V decoders (e.g., 408A-B). For example, the latency monitor 316 can measure the time delay between inputting audio data or video data to the A/V decoders, respectively, and the A/V decoders outputting decoded audio data or decoded video data, respectively, for example. The latency monitor 316 can perform other measurement techniques to determine the A/V latency. The reference to A/V can refer to one of audio or video or both audio and video. The A/V latency measurement may sometimes refer to latency measurement between endpoints, e.g., similar to the path or link latency measurement. In some cases, the A/V latency measurement may include measurement at any point in between the endpoints including between intermediary devices, such as (multi-)hop latency between at least one of an endpoint and an intermediary device or between intermediary devices.

The latency monitor 316 can send the measurement result to the latency controller 306. The latency monitor 316 may send the result periodically or in response to performing the measurement. In some cases, the latency monitor 316 can aggregate the measurement results over a predefined duration. The latency monitor 316 can send the aggregated result to the latency controller 306 after the predefined duration, for example.

The latency monitor 316 can measure the lip-sync of the A/V data and determine the lip-sync status according to the measurement. The lip-sync measurement can include a time delay or latency between each audio frame and a corresponding video frame. The lip-sync status can indicate whether the audio and video frames are in sync or out of sync. For example, the server 308 (or other data sources) can encode streams of A/V data for transmission. The server 308 can encode each audio frame and a corresponding video frame to include a presentation time stamp (PTS) for synchronizing the A/V streams. The presentation time stamp can indicate the time at which each audio and video frame is to be presented. The desynchronization (or variations) of the video stream and the audio stream can be caused by at least one of but not limited to differences in decoder buffer time between the audio decoder and video decoder, A/V streams provided from different sources using different transmission paths with respective latencies, or different sources may add more delays relative to the other.

The latency monitor 316 can monitor the PTS of each audio frame and video frame at the A/V decoders (e.g., 408A-B). For instance, when the A/V outputs (e.g., 412A-B) buffer the A/V stream, the A/V outputs can present the A/V stream according to the PTS of the audio and video frames, such that the audio and video are synchronized. A difference in the timestamps can represent latency or delay in at least one of the audio or video streams. In such cases, the latency monitor 316 can compare the PTS of the audio frame to the PTS of the video frame to determine the PTS variation or difference. The latency monitor 316 can compare the PTS difference to a predefined threshold, e.g., configured by the administrator or according to the application configuration.

If the PTS difference is greater than or equal to the predefined threshold, the latency monitor 316 can set the lip-sync status as "out of sync" or "unsynchronized", for example. Otherwise, if the PTS difference is below or within the predefined threshold, the latency monitor 316 can set the lip-sync status as "synchronized", for example.

The latency monitor 316 can send the lip-sync status to the latency controller 306. The latency monitor 316 may send information related to the lip-sync status, such as at least one of the PTS difference, whether the audio stream or the video stream is delayed (e.g., for configuring at least one of the A/V decoders), the source providing at least one of the audio stream or the video stream, or the network path taken by the A/V stream(s), among others. It should be noted that the A/V streams or other information to the client device 302 may be from multiple sources, such as two or more servers, intermediary devices, or network devices. The latency monitor 316 can measure other types of latency, not limited to those discussed herein.

The latency controller 306 can receive the measurement results from the client device 302 (e.g., the latency monitor 316), including at least one of the path latency, A/V latency, or lip-sync status. The latency controller 306 can receive other types of measurement results from the client device 302. The latency controller 306 can compare the latency to a respective predefined threshold. For example, the latency controller 306 can compare the path latency to a path latency threshold, the A/V latency to an A/V latency threshold, or the lip-sync result to a lip-sync threshold. Examples of the path latency threshold can include 30 ms, 40 ms, 50 ms, etc. Examples of the A/V latency threshold can include 10 ms, 20 ms, 30 ms, etc. Examples of the lip-sync threshold can include 20 ms, 30 ms, 45 ms, etc. It should be noted that the threshold values are provided herein as non-limiting examples and other values can be set as the threshold, e.g., according to the executed application, user preference, or administrator configuration.

The latency controller 306 can determine to enable the low latency mode for at least one device (e.g., the client device 302 or the gateway 304) in response to at least one of the latency measurements being greater than or equal to the respective threshold. The latency controller 306 can determine to enable the low latency mode for at least one device based on the lip-sync status being "unsynchronized" indicative of a lip-sync issue. The latency controller 306 can enable low latency mode by sending an instruction to the latency agent 310 (e.g., low latency configurator 318) or other latency agents to configure one or more components of the respective device in low latency mode.

In some implementations, the latency agent 310 (e.g., the latency monitor 316) can compare the latencies or results to the respective predefined threshold. In this case, the latency agent 310 may analyze the measurement results or perform features of the latency controller 306, e.g., for low latency mode determination without instructions from the latency controller 306. For instance, the predefined threshold can be provided by the latency controller 306 or stored in the data repository 320. The latency agent 310 can perform the comparison similar to the latency controller 306. Based on the comparison, the latency agent 310 can determine whether to enable or activate the low latency mode for one or more components of the client device 302. In some cases, other latency agents (e.g., the latency agent of the gateway 304) can determine whether to enable or activate the low latency mode based on the latency measurement performed at the gateway 304 or provided by the latency controller 306. If the result (e.g., measured latency) is outside the acceptable latency level, the latency agent 310 or other latency agents can enable the low latency mode by configuring one or more components of the respective device, such as the client device 302 or the gateway 304.

The latency agent 310 can include a low latency configurator 318 (e.g., sometimes referred to generally as configurator 318). The low latency configurator 318 can configure one or more components of the client device 302 in low latency mode. Configuring the component(s) in low latency mode can refer to adjusting or changing the operation or configuration of the component(s) to increase performance (e.g., processing power or clock frequency), prioritize the traffic (e.g., latency-sensitive packets) associated with the low latency application, or provide low latency service for the latency-sensitive packets, for example. The configuration to be performed by the low latency configurator 318 can be provided by the latency controller 306. In some cases, the configuration to be performed can be stored in the data repository 320, such that the low latency configurator 318 can execute in the low latency mode.

For example, the low latency configurator 318 can configure the internal function of the client device 302, such as the A/V decoders, HDMI, WiFi STA, etc., to reduce the latency or synchronize A/V streams for the low latency application. The low latency configurator 318 can configure the A/V decoders in low latency mode in response to the A/V latency being greater than or equal to the predefined threshold. The low latency configurator 318 can configure the A/V decoders by increasing the clock frequency of the A/V decoders to increase processing speed. The low latency configurator 318 can configure the HDMI in low latency mode by adjusting the HDMI settings (e.g., buffer setting), bypassing certain image processing features (thereby reducing input lag), optimizing audio settings, etc. The low latency configurator 318 can configure the WiFi STA in low latency mode by at least one of disabling power-saving mode (if enabled), prioritizing latency-sensitive traffic for the low latency application, adjusting frequency band or channel, etc. The low latency configurator 318 can apply other low latency functionalities, such as reducing certain loads on the encoder (e.g., on the server 308 or other sources) or decoder (e.g., on the client device 302) to reduce processing time and latency, resetting A/V streams to synchronize (or resynchronize) the streams, etc.

One or more other devices including respective latency agents can configure one or more components in low latency mode in response to the latency being above the acceptable latency level. For example, the gateway 304 (e.g., latency agent 422) can configure the WiFi AP in low latency mode by at least one of increasing the processing speed, prioritizing latency-sensitive traffic by pushing the latency-sensitive traffic to the front of the queue or to a priority queue, etc.

In another example, to enable the low latency mode, the gateway 304 or other network devices can configure or set up the DOCSIS system. For instance, the latency-sensitive traffic can queue to a low latency pipe (e.g., low latency service flow pipe), while other non-latency-sensitive traffics can queue to a classic pipe (e.g., classic service flow pipe). The low latency pipe can prioritize the data packets by requesting or obtaining more data transmission opportunities over a communications interface, such that latency-sensitive packets can be forwarded to the client device 302 more promptly. The classic pipe can be used for queuing non-latency-sensitive packets for forwarding to the client device 302, in some cases, with less transmission opportunities over a communications interface. In some cases, the low latency pipe and the classic pipe can be used for forwarding traffic to the server 308 or other sources.

In some implementations, the latency controller 306 can instruct one or more intermediary devices (or network nodes) to provide a relatively better connection (e.g., less load, higher priority, or narrower frequency band) for latency-sensitive traffic from the client device 302. For instance, the latency agent 310 (e.g., the latency monitor 316) can provide the communication path between the client device 302 and the server 308 to the latency controller 306. The communication path can include the intermediary devices relaying the packets. Based on the communication path for the low latency packets, the latency controller 306 can instruct one or more intermediary devices in the path to provide a relatively better connection for the low latency packets from the client device 302, for example.

In some implementations, the latency controller 306 can configure one or more communication paths to handle certain packets or connections experiencing higher latency than others. In some configurations, the latency controller 306 may keep track of available low latency control (e.g., components available for configuration in low latency mode), such that the latency controller 306 can instruct one or more devices to configure the hardware (or software) to satisfy low latency application requirements (e.g., predefined by the developer or moderators).

The latency agent 310 can include a data repository 320. The data repository 320 may sometimes be referred to as a data storage, memory, database, or data library, to name a few. The data repository 320 can include at least an application storage 322, an input parameters storage 324, a traffic data storage 326, a measurement data storage 328, and a configuration storage 330. The data repository 320 can include data stored in at least one remote storage device (e.g., data stored on the server 308). In some cases, the client device 302 can relocate or transfer data between the data repository 320 and the remote storage device. In this case, the client device 302 can access data from the remote storage device. The data repository 320 can be referred to as the memory of the client device 302, for example. The data repository 320 can be accessed by one or more components within the client device 302 or latency agent 310 (e.g., interface 312, application monitor 314, latency monitor 316, or low latency configurator 318). The data repository 320 can be accessed by other devices within the network 301, such as at least one of the gateway 304, the latency controller 306, or the server 308.

The application storage 322 can include, store, or maintain a list of applications installed on the client device 302. The list of applications can include information related to the applications, such as application name, process, metadata, version, permission, or other application-related information. The list of applications can indicate the type of application associated with each application, e.g., low latency application or non-low latency application. The application storage 322 can store resources for the applications installed on the client device 302.

The input parameters storage 324 can include, store, or maintain input parameters for performing the latency measurements (e.g., path latency measurement, A/V latency measurement, or lip-sync measurement). The input parameters can be provided by the latency controller 306 or other devices within the network 301. The input parameters can include at least one of but not limited to a measurement duration, a type of latency measurement (e.g., multi-hop latency, RTT, or end-to-end latency), data size or data points to send to the latency controller 306, the statistical metric type, measurement frequency, or measurement intervals. In some cases, the input parameters storage 324 can include one or more predefined thresholds for comparison with the measurement result to determine whether to enable the low latency mode. The input parameters storage 324 can include other information for the latency monitor 316 to perform the latency measurement or information provided by the latency controller 306.

The traffic data storage 326 can include, store, or maintain data packets or information associated with the traffics or flows communicated at least between the client device 302 and the server 308 or between the latency agent 310 and the latency controller 306. For example, the traffic data storage 326 can store data packets of various flows, including information associated with the data packets, such as 4 or 5-tuples (or other header fields), service flow number associated with individual packets, metadata associated with the data packets, etc. The data packets from the traffic data storage 326 can be communicated or mapped to the one or more queues for wireless communication to the one or more devices in the network 301, for example. In some cases, the traffic data storage 326 may store information from other devices within the network 301. The traffic data storage 326 can store data packets from the application executed on the client device 302. The traffic data storage 326 may store resources or information received from the server 308 or other sources for (e.g., requested by) the application. The traffic data storage 326 can store other data received by the interface 312, for example.

The measurement data storage 328 can include, store, or maintain measurement information. The measurement data storage 328 can store path latency measurement, A/V latency measurement, or lip-sync measurement from the latency monitor 316. The measurement data storage 328 can store aggregated or other measurement results. The measurement data storage 328 can store the lip-sync status. The measurement data storage 328 can store information related to the measurement, such as measurement time, measurement duration, measurement unit, the path taken by the packets (e.g., for path latency measurement), network topology, etc. The measurement results can be accessed by the latency controller 306.

The configuration storage 330 can include, store, or maintain information related to the configuration of the client device 302. The configuration can refer to the settings or operating parameters of one or more components. For configuration storage of other devices, the configuration storage can store the configuration information associated with the respective devices. The configuration storage 330 can include available components or devices to configure in low latency mode, such as the decoder, encoder, HDMI, WiFi STA, WiFi AP, etc. The configuration storage 330 can include the configuration of one or more components of the client device 302, such as decoder configuration, HDMI configuration, WiFi STA configuration, etc. For example, the decoder configuration can include at least buffer size adjustment, hardware acceleration (e.g., adjusting clock frequency), or adaptive bitrate streaming. In another example, the WiFi STA configuration can include at least QoS features (e.g., WiFi multi-media for prioritization of video and audio traffic), channel selection (e.g., communicate latency-sensitive packets to a less congested WiFi channel), or other network configurations. The configuration storage 330 can include other configurations or settings for the latency agent 310 (e.g., low latency configurator 318) to configure the component(s) of the client device 302 not limited to those discussed herein.

It should be noted that features or functionalities of the latency agent 310 can be performed by other devices within the system 300 including respective latency agents. For example, multiple devices within the system 300 can include or be installed with respective latency agents, not limited to the client device 302. Taking the gateway 304 as an example, the gateway 304 can include a latency agent (e.g., 422) configured to perform features or functionalities similar to the latency agent 310. The latency agents can include or perform operations specific to their installed devices. For instance, the latency agent of the gateway 304 can perform operations specific to the gateway 304 for latency management, such as monitoring data traffic or flow to determine whether the traffic is latency-sensitive or associated with a low latency application. The features or operations of the latency agents can be described in conjunction with at least one of FIGS. 4-5, for example.

FIG. 4 illustrates a block diagram of example A/V data paths 400, in accordance with one or more implementations. The A/V data paths 400 can include data transmission paths for A/V data between various components or devices within the communication system 100, the system 300, or other components or devices as described in conjunction with but not limited to FIGS. 1A-4. The components of FIG. 4 can be described in conjunction with FIG. 3. The operations of one or more components for the A/V data paths 400 can be described in conjunction with FIG. 5. It should be noted that other devices can be included for establishing the A/V data paths 400. Further, it should be noted that the A/V data paths 400 shown in FIG. 4 are provided as an example for the communication of A/V data, application control, or status information. The A/V data paths 400 can be linked to other components or devices.

As shown, for example, the block diagram of the A/V data paths 400 can include the client device 302, the gateway 304, the latency controller 306, and the server 308. The block diagram of FIG. 4 can include an application user interface 416 communicatively coupled to the client device 302 (e.g., application client device), one or more speakers 414A and display 414B connected to the client device 302, and termination device 424 (e.g., broadband access termination device) and core router 426 intermediate between the gateway 304 (e.g., broadband access gateway) and the server 308. The application user interface 416 can be an intermediary platform between the user and the client device 302 (or the software applications installed on the client device 302). The user can interact or interface with the application user interface 416, such as user interface (UI) features (e.g., buttons, navigation bars, or interactive elements), to communicate with the application or operating system of the client device 302. The user can provide instructions, input data, or execute actions via the application user interface 416, such as selecting or launching an application. The application selected by the user via the application user interface 416 can indicate the type of application to be launched, including low latency application or non-low latency application.

The termination device 424 can be a device intermediary between the gateway 304 and the core router 426. The termination device 424 can provide an interface for broadband connection. The termination device 424 can manage data traffic between the gateway 304 and the core router 426, such as between the local area network (LAN) and the network infrastructure, such as the core router 426. The termination device 424 can integrate modem functionalities, such as digital subscriber line (DSL) or cable modem, for example, to establish a physical link to the broadband network and translate signals between the LAN and other network devices.

The core router 426 can serve as a central node within the network infrastructure. The core router 426 can manage or direct data traffic between endpoints. In this case, the core router 426 can manage traffic from the server 308 (or other servers or sources) to the termination device 424 or other network devices to relay information between at least the server 308 and the client device 302. For example, the core router 426 can route data packets across the network backbone (or main infrastructure of the network 301). The core router 426 can include various routing protocols or traffic engineering capabilities to facilitate network throughput. For purposes of providing examples, the termination device 424 and the core router 426 can be intermediary devices, among other intermediary devices, between the server 308 and the client device 302 for latency consideration.

As shown in FIG. 4, the client device 302 can include at least a CPU 402 (e.g., host CPU), a WiFi STA 404, an application client 406, an audio decoder 408A, a video decoder 408B, HDMI 410 including an audio output 412A and a video output 412B, and the latency agent 310. The CPU 402 can correspond to the processor of the client device 302, configured to execute the operations or tasks of the client device 302 discussed herein. The WiFi STA 404 can provide a connection to a WiFi network, e.g., communicate to the WiFi AP 418 to establish a wireless connection. The WiFi STA 404 can be a component of the client device 302 configured to receive network resources or transmit data to other network devices. For purposes of providing examples, the WiFi STA 404 can receive application resources for executed applications and transmit application data to the server 308, for example.

The application client 406 can include or refer to software configured to interact with one or more applications executed on the client device 302. The application client 406 can handle graphic rendering, processing application logic, managing user inputs in the application, or various communications with the server 308 to facilitate the operation of the application. In some cases, the application client 406 may be a game client or a streaming client, for example.

The audio decoder 408A and the video decoder 408B may sometimes be referred to as A/V decoders 408A-B. The A/V decoders 408A-B can include hardware components, software components, or a combination of hardware and software components configured to decode compressed A/V data. For instance, the server 308 or other sources of the A/V data can compress the A/V data for transmission via A/V encoders. The A/V decoders 408A-B can receive the compressed A/V data via the application client 406. The A/V decoders 408A-B can decompress and reconstruct the encoded A/V streams using at least one suitable decompression or decoding technique, such as at least one of lossy compression decoding, lossless compression decoding, transform coding decoding, etc. The A/V decoders 408A-B can provide decoded A/V streams or data to the HDMI 410.

The HDMI 410 can include audio output 412A and video output 412B. The audio output 412A and the video output 412B can sometimes be referred to as A/V outputs 412A-B. The A/V outputs 412A-B can transmit uncompressed A/V data between devices, such as from the client device 302 to the speakers 414A or display 414B. For example, the audio output 412A can output signals to the speakers 414A for audio presentation to the user. The video output 412B can output signals to the display 414B (e.g., display device) for visual presentation to the user. The client device 302 may include other types of output interface, such as display port, digital visual interface, etc., not limited to HDMI 410. The application user interface 416 can be a part of the client device 302 or an external device coupled to the client device 302. The application user interface 416 can provide an interface for the user to interact with the client device 302 (e.g., interact with the operating system to launch an application or interact with the executed application to use application functionalities).

As shown in FIG. 4, the gateway 304 can include a WiFi AP 418 and a modem 420 (e.g., broadband access modem, GPON mode, or cable). The WiFi AP 418 can provide wireless connectivity to facilitate or allow for wireless communication between the client device 302 and other network devices, such as the server 308 or intermediary devices. The WiFi AP 418 can receive data from the client device 302 via a wired connection (e.g., Ethernet connection). The WiFi AP 418 can allow multiple devices to connect simultaneously, thereby providing internet access and network resources to devices within a wireless range. The modem 420 can be a bridge between an internet service provider (ISP) and the LAN. The modem 420 can convert incoming signals from the ISP (e.g., via cable, fiber, DSL, or satellite) for communication with the devices (e.g., client device 302) connected to the LAN. The modem 420 can convert signals from the LAN devices for transmission over the ISP network. The modem 420 may be directly or indirectly connected to the client device 302.

The modem 420 can include a latency agent 422. The latency agent 422 can include one or more features or functionalities similar to the latency agent 310. For example, the latency agent 422 can detect a launch or execution of a low latency application based on at least one of data packet information (e.g., 4 or 5-tuple, header information, metadata, or flag indicative of low latency application). In another example, the latency agent 422 can monitor or measure data communication latency (e.g., end-to-end latency, RTT, or other types of latency) to or from the client device 302 or the server 308. The latency agent 422 can provide the measurement results to the latency controller 306. The latency agent 422 may receive instructions from the latency controller 306 to configure the component(s) of the gateway 304 in the low latency mode based on the measurement result.

In some cases, the latency agent 422 may include features or perform operations different from the latency agent 310. For example, the latency agent 422 may configure the components of the gateway 304 that are different from the component(s) of the client device 302. The latency agent 422 can receive different instructions from the latency controller 306. In some configurations, in the low latency mode, the latency agent 422 can be instructed to configure one or more components of the gateway 304 and the latency agent 310 may not be instructed to configure one or more components of the client device 302. In some other configurations, in the low latency mode, the latency agent 422 may not be instructed to configure one or more components of the gateway 304 and the latency agent 310 may be instructed to configure one or more components of the client device 302.

Further, as shown in the A/V data paths 400, the audio data path and the video data path can traverse from the server 308 to the speakers 414A via a plurality of intermediary devices or components. The application control or status information can be provided from the client device 302 to the server 308. Although not shown, it should be noted that the A/V data paths 400 can be from other sources, not limited to the server 308. The operations of the devices or components shown in FIGS. 3-4 can be described in conjunction with FIG. 5.

FIG. 5 illustrates an example flow diagram of the communication 500 between the client device 302 and the latency controller 306, in accordance with one or more implementations. The communication 500 can be between components of the communication system 100, the computer 2001, the system 300, or other components or devices as described in conjunction with but not limited to FIGS. 1A-4. It should be noted that the communication 500 is a non-limiting exemplary scenario illustrating example communications between the client device 302 and the latency controller 306, and other exemplary scenarios or information may be exchanged between the client device 302 and the latency controller 306 in any other orders or arrangements, for example. For instance, the communication 500 can involve the latency agent 422 of the gateway 304 and the latency controller 306, e.g., the latency agent 422 may perform one or more features or operations of the latency agent 310 discussed herein.

At operation 502, the client device 302 can trigger an application monitoring tool or the latency agent 310 (e.g., application monitor 314) for application monitoring. The client device 302 can monitor for launched or executed applications according to the creation of a new process or based on an interaction from the user (via the application user interface 416) indicative of a request to launch an application. In response to detecting a launch of a low latency application, the client device 302 (e.g., the latency agent 310) can send a notification to the latency controller 306 indicating that the low latency application or service has started.

At operation 504, the latency controller 306 can trigger the latency agent 310 to start performing link (or path) latency measurement for a predefined measurement duration (e.g., 1 minute) by providing the input parameters including the predefined measurement duration. Upon receiving the input parameters from the latency controller 306, the latency agent 310 can initiate link latency measurement. The input parameters can include the interval or frequency to perform the link latency measurement for the predefined duration. In some cases, the latency controller 306 can enable LLD for the DOCSIS link to reduce network latency concurrently to triggering the latency agent 310 to initiate latency measurement or in response to receiving the notification from the latency agent 310.

At operation 506, the latency controller 306 can trigger the latency agent 310 to activate A/V latency and lip-sync measurement. Triggering the latency agent 310 can refer to sending an instruction to the latency agent 310 to start a measurement event, for example. The latency agent 310 can receive the triggers from the latency controller 306. At operation 508, the latency agent 310 (e.g., latency monitor 316) can perform link latency measurement for the predefined duration. For purposes of providing examples, the link latency measurement can be a multi-hop latency measurement indicating the latency between the client device 302 and the server 308 via one or more intermediary devices. The latency agent 310 can report or forward measurement results to the latency controller 306.

At operation 510, the latency agent 310 (e.g., latency monitor 316) can perform A/V latency and lip-sync measurements via A/V decoders 408A-B. For example, via the A/V decoders 408A-B, the latency agent 310 can measure the A/V data processing latency (e.g., decoding delay), delays time variation between reception of audio frames and video frames based on PTS, etc. The latency agent 310 can report the measurement result including the A/V latency and lip-sync status to the latency controller 306.

At operation 512, the latency controller 306 can analyze the output (e.g., measurement results) from the latency agent 310 (or other latency agents installed on devices intermediate between the client device 302 and the server 308 or other data sources). The latency controller 306 can analyze the A/V output data to determine the synchronization between the A/V frames. The latency controller 306 can determine whether the latency is relatively high based on a comparison between the measurement result from the latency agent 310 and at least one predefined threshold. If the result is greater than or equal to the predefined threshold (or if there exists a lip-sync issue), the latency controller 306 can enable the low latency mode for one or more components of the client device 302, among other components available for low latency mode (e.g., gateway 304). The latency controller 306 can send an instruction or indication to the latency agent 310 to configure one or more components of the client device 302 in the low latency mode. In some cases, the latency agent 310 may trigger the latency agent 310 to activate low latency mode on at least one specific component of the client device 302.

At operation 514, the latency agent 310 (e.g., low latency configurator 318) can configure one or more components of the client device 302 in low latency mode. For example, the latency agent 310 can configure at least one of the A/V decoders 408A-B in low latency mode. To configure the A/V decoders 408A-B, the latency agent 310 may control the decoder buffer state, e.g., manage the amount of data stored in the buffer. The data stored in the buffer of the A/V decoders 408A-B can include incoming compressed audio or video data before decoding and playback. The latency agent 310 may adjust the buffer size to enable low latency mode, e.g., decreasing buffer size to increase latency by allowing the decoder to process and output data relatively faster compared to the original buffer size. Each of the A/V decoders 408A-B may include multiple frame buffers at the output stage for outputting decoded A/V data to the HDMI 410, for example. In some cases, the latency agent 310 can receive or store the buffer size configuration to be used in the low latency mode and the buffer size configuration to be used when disabling or exiting the low latency mode.

The latency agent 310 can configure at least one of the A/V decoders 408A-B by increasing the clock speed or frequency (e.g., processing speed) of at least one of the A/V decoders 408A-B. For example, if the latency of the A/V streams is at or above the predefined threshold, the latency agent 310 can increase the clock frequency of the A/V decoders 408A-B. In another example, based on the lip-sync status (e.g., if the A/V streams are not synchronized), the latency agent 310 can increase the clock frequency of at least one decoder to synchronize the video and audio paths at the client device 302. For instance, the latency agent 310 can increase the clock frequency of the audio decoder 408A if the audio frames are delayed compared to the video frames. The latency agent 310 can increase the clock frequency of the video decoder 408B if the video frames are delayed compared to the audio frames. By increasing the clock frequency of at least one of the A/V decoders 408A-B, the A/V streams can be synchronized for presentation to the user.

In some cases, the latency agent 310 can determine to control the rate of output from at least one of the A/V decoders 408A-B based on the A/V measurement or lip-sync status. Controlling the output rate from the A/V decoders 408A-B can involve adjusting the rate at which the A/V decoders 408A-B convert compressed data into the playable format (e.g., original format before the compression).

In some implementations, the latency agent 310 may determine to control one or more QoS attributes of WiFi communications or broadband access communications. The QoS attribute can refer to at least one metric or parameter indicative of the performance or reliability of data transmission across the network. Examples of the QoS attribute may include but are not limited to at least one of a predefined bit rate, latency (e.g., RTT or end-to-end latency), delay variation, jitter (e.g., variation in packet arrival times), bandwidth, packet loss, throughput, etc., of the network communications.

Controlling the one or more QoS attributes can refer to a procedure or process to manage various QoS metrics within a network to achieve desired performance standards for data communications or transmissions. In some configurations, controlling the one or more QoS attributes may involve the latency agent 310 (or other latency agents) configuring or controlling one or more components of the respective device (e.g., the client device 302) to manage resource allocation, route traffic, or implement predefined policies, techniques, or technologies to regulate the characteristics of the QoS attribute(s). For example, the latency agent 310 may configure the routing protocol to select the fastest path or traffic path with the least traffic, configure the driver setting of the network interface card, or offload tasks from the network interface card to other hardware components to minimize latency.

In another example, the latency agent 310 can adjust the buffer size in one or more components (e.g., A/V decoders 408A-B, router, or switch), implement traffic shaping, or configure QoS settings on the network interface card to reduce jitter. In yet another example, the latency agent 310 may implement software-defined networking to dynamically adjust the routing paths based on real-time network conditions to improve or optimize packet routing by ensuring the usage of the fastest or least congested paths for latency-sensitive traffic.

The latency agent 310 can determine to control the QoS attributes based on at least the one or more measurements of the A/V latency and the lip-sync status. For instance, based on the lip-sync status indicating that the audio and video streams are not synchronized or the A/V latency is at or above a predefined acceptable level/threshold, the latency agent 310 can control the one or more QoS attributes for one or more components to improve the latency and/or (re-) synchronize the audio and video streams. It should be noted that the latency agent 310 may determine to control other aspects of the WiFi or broadband access communications, not limited to the QoS attributes provided herein.

In some cases, the latency agent 310 can configure the WiFi STA 404 (or the wireless communication module) of the client device 302 in low latency mode. The WiFi STA 404 can include, correspond to, or be a part of a wireless communication module of the client device 302, such as a Wi-Fi chip, a Bluetooth component, or other hardware component allowing the client device 302 to communicate wirelessly with other devices or components. For example, the latency agent 310 can enable QoS setting of the WiFi STA 404 to prioritize latency-sensitive traffic, adjust channel settings to route latency-sensitive traffic to a less congested channel, optimize power settings (e.g., disable power-saving mode), etc. The latency agent 422 may adjust the transmission power to a predefined level to reduce interference and/or latency, e.g., increase or decrease transmission power. In some cases, the latency agent 422 can configure the WiFi AP 418 connected to the client device 302 in low latency mode. The latency agent 422 may configure the WiFi AP 418 similar to the latency agent 310 configuring the WiFi STA 404, for example. The latency agent 310 (or other latency agents) can configure one or more other components to increase processing power or enable other low latency features to support the latency-sensitive traffic associated with the low latency applications, with latency beyond the acceptable level or lip-sync issue.

At operation 516, the latency controller 306 may periodically trigger the latency agent 310 (or A/V decoders 408A-B) to monitor the link latency status because the network condition may change over time. For instance, based on the analysis, the latency controller 306 may determine that the latency is within the acceptable level and the A/V streams are synchronized, at operation 512. In this case, the latency controller 306 may not enable the low latency mode and proceed to periodically trigger the latency agent 310 to monitor the latency status during the execution of the low latency application. In another example, after enabling the low latency mode, the network condition may improve over time, thereby bringing the latency (e.g., path or link latency or A/V latency) within the acceptable level. In such cases, the latency agent 310 can periodically monitor the latency status to potentially disable the low latency mode, to reduce resource consumption while maintaining the latency within the acceptable level.

In some implementations, the latency agent 310 (e.g., application monitor 314) can detect that the low latency application has been suspended or terminated (e.g., low latency application or service has ended). The latency agent 310 can send a notification to the latency controller 306 indicating that the low latency application has ended. At operation 518, the latency controller 306 can terminate the periodic latency measurement or suspend any measurement operation related to the terminated (or suspended) low latency application. The latency controller 306 can send a message or trigger the latency agent 310 to disable low latency mode (if activated) for the component(s) of the client device 302. The latency controller 306 may trigger other latency agents of other devices to disable the low latency mode. In some cases, the latency controller 306 may disable LLD and low latency mode for WiFi AP in response to the termination of the low latency application, for example.

At operation 520, in response to receiving the message from the latency controller 306 to disable low latency mode, the latency agent 310 can configure the component(s) of the client device 302 to exit low latency mode. Configuring the component(s) to exit the low latency mode can involve reverting (or in some cases resetting) the configuration of the component(s) to a state or a version before when the low latency mode was activated. It should be noted that the operations 502-520 discussed herein are provided as examples and the client device 302, the latency agent 310, or the latency controller 306 may perform other operations not limited to the operation hereinabove.

Figure 6:
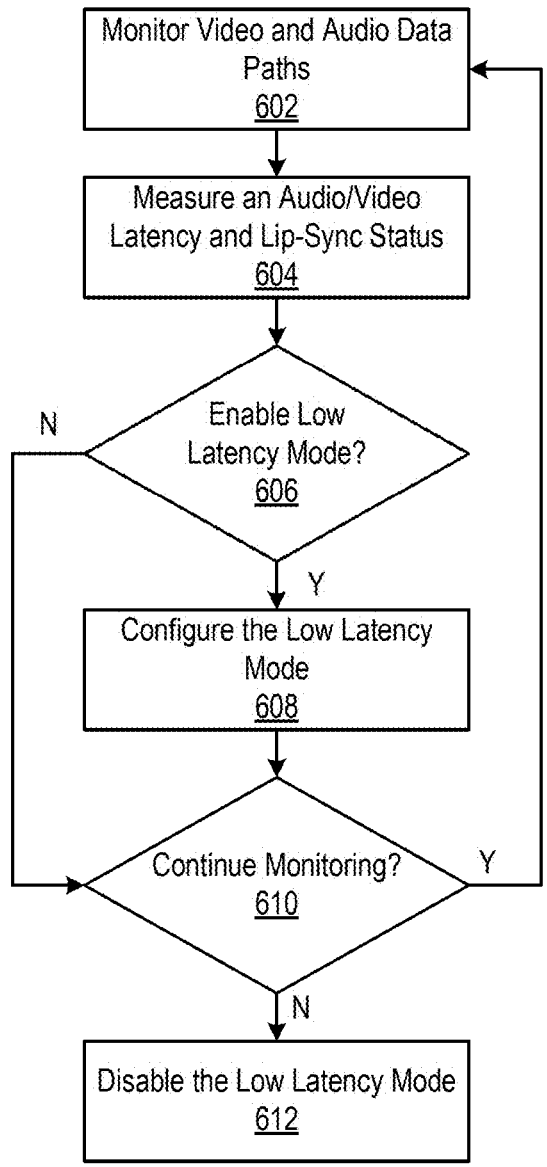
FIG. 6 is an example flow diagram of a method for latency optimization for cloud applications, in accordance with one or more implementations.

FIG. 6 illustrates an example flow diagram of a method 600 for latency optimization for cloud applications, in accordance with one or more implementations. The method 600 can be executed, performed, or otherwise carried out by one or more components of the system 300 (e.g., network 301, client device 302, gateway 304, latency controller 306, or server 308), one or more components of the communication system 100, the computer 2001, one or more components of the computing environment 2060, or any other computing devices described herein in conjunction with FIGS. 1A-4. The method 600 can include monitoring video and audio data paths, at ACT 602. At ACT 604, the method 600 can include measuring A/V latency and lip-sync status. At ACT 606, the method 600 can include determining whether to enable low latency mode. At ACT 608, the method 600 can include configuring the low latency mode. At ACT 610, the method 600 can include determine whether to continue monitoring. At ACT 612, the method 600 can include disabling the low latency mode.

Still referring to FIG. 6 in further detail, at ACT 602, the latency agent (e.g., latency agent 310 or latency agent 422, in some cases) of a client device (e.g., client device 302 including A/V decoders 408A-B) can monitor the video and audio data paths of an application communicating A/V data from one or more servers (e.g., server 308) to the client device. The application can be a low latency application. The latency agent can start monitoring the A/V data paths in response to a launch of the low latency application or in response to receiving an instruction (or trigger) from a latency controller (e.g., latency controller 306). The latency agent can monitor the A/V data paths for A/V data packets transmitted from the one or more servers to the client device. The A/V data packets may be transmitted via one or more intermediary devices. In some cases, the client device can receive the A/V data packets from the same server. In some cases, the client device may receive the A/V data packets from different servers or sources.

At ACT 604, during the monitoring of the A/V data paths, the latency agent can measure A/V latency and determine a lip-sync status of the A/V data paths of the application. The latency agent can perform the measurement using (or via) the A/V decoders of the client device. For example, for A/V latency, the latency agent can determine the processing time for the A/V decoders to decode and output the decompressed A/V data. In another example, the latency agent can determine the A/V latency based on the delay between when the audio data and the video data are received by the A/V decoders. The latency agent may determine the A/V latency based on the delay between when the audio data and the video data are decompressed and output by the A/V decoders, respectively.

In this example, the A/V latency can relate to the lip-sync status. For instance, the latency agent can compare the delay between the A/V data to a predefined threshold (e.g., 10 ms, 20 ms, or 30 ms). If the delay is greater than or equal to the predefined threshold, the latency agent can determine that the A/V data are not synchronized and the lip-sync status can be set to "error" or "unsynchronized", for example. Otherwise, if the delay between the A/V data received at the A/V decoders is less than the predefined threshold, the latency agent can determine that the A/V data are synchronized and the lip-sync status can be set to "synchronized", for example. The lip-sync status can be represented by a bit or other value, e.g., '1' for synchronized and '0' for unsynchronized, or vice versa.

In some implementations, the latency agent can perform lip-sync measurement based on the PTS of individual audio frames and video frames. The latency agent can compare the PTS of the audio frame and the video frame received by the A/V decoders at a time instance to determine the timestamp differences. In this case, the latency agent can determine the lip-sync status by comparing the timestamp (e.g., PTS) difference to a predefined threshold (e.g., 5 frames, 10 frames, or 15 frames). The latency agent can set the lip-sync status to '0' for unsynchronized if the timestamp difference is greater than or equal to the predefined threshold. The latency agent can set the lip-sync status to '1' for synchronization if the timestamp difference is below the predefined threshold.

In some implementations, the latency agent can measure the link (or path) latency. The link latency may include or refer to multi-hop latency or end-to-end latency, for example. The latency agent can measure the link latency by monitoring the A/V data packets traversing from the one or more servers to the client device. The link latency can include a difference between a first time when the server sends the A/V data and a second time when one of the client device receives the A/V data, the A/V decoders receive the A/V data, or when the compressed A/V data is decompressed and output by the A/V decoders. In some cases, the link latency can include an RTT from when the client device sends inputs (e.g., button presses or clicks) to the one or more servers until the client device receives a response (e.g., changes to A/V data according to the inputs or an acknowledgment) from the one or more servers.

At ACT 606, the latency agent can determine, based on at least one or more measurements of the A/V latency and the lip-sync status, whether to enable a low latency mode for at least one of the video decoder or the audio decoder, among other components of the client device. The latency agent can determine whether to enable the low latency mode in response to performing the measurement of the A/V latency and lip-sync status. For example, the latency agent can compare the A/V latency measurement to a predefined threshold to determine whether the A/V latency is within an acceptable level. In this example, the latency agent can determine to enable the low latency mode in response to the latency agent determining that the one or more measurements of the A/V latency are above (or equal to) the predefined threshold. The latency agent can proceed to ACT 608 to enable the low latency mode. Otherwise, if the one or more measurements of the A/V latency are below the predefined threshold, the latency agent can determine not to enable the low latency mode (or disable the low latency mode, if enabled) and proceed to ACT 610.

In some implementations, the latency agent can determine whether to enable the low latency mode based on the lip-sync status. For example, the latency agent can determine that the lip-sync status indicates the video and audio data paths are out of sync by at least a predefined threshold, e.g., a predefined PTS difference or delay between when the audio data and video data are received at the A/V decoders. In response to the determination, the latency agent can determine to enable the low latency mode. The latency agent can proceed to ACT 608 after determining to enable the low latency mode. In another example, the latency agent can determine that the lip-sync status indicates that the video and audio data paths are out of sync by a value below the predefined threshold (e.g., not out of sync). In this case, the latency agent can determine not the enable the low latency mode and proceed to ACT 610.

In some implementations, the latency agent can compare the link latency measurement to a predefined threshold. The latency agent can determine to enable the low latency mode based on the link latency measurement being at or above the predefined threshold. The latency agent can determine not to enable the low latency mode or disable the low latency mode based on the link latency measurement being below the predefined threshold.

At ACT 608, in response to the determination to enable the low latency mode, the latency agent can configure the low latency mode on at least one of the video decoder or the audio decoder, among other components of the client device. Enabling the low latency mode on the decoder can include, for example, changing a clock speed of at least one of the A/V decoders. Changing the clock speed can include increasing the clock speed to reduce the processing or decompressing time of the A/V data for a relatively faster output by at least one of the A/V decoders.

In some implementations, responsive to the determination of the lip-sync status indicating out-of-sync audio and video data, the latency agent can synchronize (or resynchronize) the video and audio data paths at the client device using one of the video decoder or the audio decoder by increasing the clock speed of at least one of the video decoder or the audio decoder. For example, if the audio data is delayed relative to the video data, the latency agent can increase the clock speed of the audio decoder, such that the audio decoder can decompress the audio data relatively faster and the A/V decoders can output decompressed A/V data at around the same time (e.g., within an acceptable difference or variation). Otherwise, if the video data is delayed relative to the audio data, the latency agent can increase the clock speed of the video decoder, such that the video decoder can decompress the video data relatively faster and the A/V decoders can output decompressed A/V data at around the same time.

In some implementations, enabling the low latency mode on the decoder can include controlling a rate of output from at least one of the video decoder or the audio decoder based on at least the one or more measurements of the A/V latency and the lip-sync status. For example, based on the lip-sync status indicating that the A/V data are not synced, the latency agent can adjust the rate of output from at least one of the video decoder or the audio decoder, such that the A/V data can be decompressed and output to the display and audio devices at around the same time period (e.g., within the predefined A/V latency threshold). The latency agent can adjust the rate according to the A/V latency, where relatively higher A/V latency can further increase the rate of output for the decoder configured to decode the delayed audio data or video data or further decrease the rate of output for the decoder configured to decode the preceding audio data or video data, for example.

In some implementations, configuring the low latency mode on at least one of the A/V decoders can involve the latency agent controlling one or more states of a buffer of at least one of the A/V decoders. Controlling the one or more states of the buffer can involve managing the amount of data stored in the buffer before processing. For example, the latency agent can configure the decoder by adjusting the buffer size of the decoder. In some cases, the latency agent may decrease the buffer size to increase the processing and outputting speed of the decoder. The latency agent can control other states of the buffer, such as buffer fill level, buffer threshold, buffer flow control, etc., to accelerate the decoding speed of at least one of the A/V decoders to account for A/V latency and lip-sync status.

In some implementations, the latency agent can configure the low latency mode on at least one of a wireless communication module of the client device or an access point connected to the client device. Configuring the low latency mode on the wireless communication module or the access point can involve setting the component (e.g., Wi-Fi chip, Bluetooth chip, or access point) to prioritize the audio data and video data for the low latency application, adjusting the power setting, configuring the component to select optimal channel for certain data packets, etc.

At ACT 610, the latency agent can determine whether to continue monitoring the A/V data paths. For example, the latency agent can be configured (or instructed by the latency controller) to periodically monitor the data path during the execution of the low latency application. If the low latency application remain executing on the client device, the latency agent can continue monitoring the A/V data paths to determine whether to enable (or disable) the low latency mode. In response to detecting that the low latency application has been terminated, the latency agent can proceed to ACT 612.

At ACT 612, the latency agent can disable the low latency mode in response to the termination of the low latency application. The latency agent can disable the low latency mode by configuring the one or more components of the client device to exit the low latency mode. By exiting the low latency mode, the settings or configurations of the component(s) can be reverted to before entering the low latency mode. In some cases, the settings or configurations of the component(s) may be reset.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure. The headings provided in this document are non-limiting.

The applications and servers have been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:
monitoring, by an agent of a client device comprising an audio decoder and a video decoder, video and audio data paths of an application communicating audio/video (A/V) data from one or more servers to the client device;
measuring, by the agent using the audio decoder and the video decoder, an A/V latency and a lip-sync status of the video and audio data paths of the application;
determining, by the agent based on at least one or more measurements of the A/V latency and the lip-sync status, to enable a low latency mode for at least one of the video decoder or the audio decoder; and
configuring, by the agent responsive to the determination, the low latency mode on one of the video decoder or the audio decoder.

2. The method of claim 1, further comprising synchronizing, by the agent responsive to the determination of the lip-sync status, the video and audio data paths at the client device using one of the video decoder or the audio decoder.

3. The method of claim 1, further comprising determining, by the agent, that the one or more measurements of the A/V latency are above a threshold.

4. The method of claim 1, further comprising determining, by the agent, that the lip-sync status indicates the video and audio data paths are out of sync by at least a threshold.

5. The method of claim 1, further comprising configuring, by the agent responsive to the determination, the low latency mode on at least one of a wireless communication module of the client device, an access point, or a communications interface connected to the client device.

6. The method of claim 1, further comprising determining, by the agent based on at least the one or more measurements of the A/V latency and the lip-sync status, to control a rate of output from at least one of the video decoder or the audio decoder.

7. The method of claim 1, wherein configuring the low latency mode on one of the video decoder or the audio decoder comprises changing, by the agent, a clock speed of one of the video decoder or the audio decoder.

8. The method of claim 1, wherein configuring the low latency mode on one of the video decoder or the audio decoder comprises controlling, by the agent, one or more states of a buffer of at least one of the video decoder or the audio decoder.

9. A system comprising:
a client device comprising one or more processors and memory, an agent, an audio decoder, and a video decoder, the agent of the client device configured to:
monitor video and audio data paths of an application communicating audio/video (A/V) data from one or more servers to the client device;
measure, using the audio decoder and the video decoder, an A/V latency and a lip-sync status of the video and audio data paths of the application;
determine, based on at least the one or more measurements of the A/V latency and the lip-sync status, to enable a low latency mode for at least one of the video decoder or the audio decoder; and
configure, responsive to the determination, a low latency mode on one of the video decoder or the audio decoder.

10. The system of claim 9, wherein the agent is configured to:
synchronize, responsive to the determination of the lip-sync status, the video and audio data paths at the client device using one of the video decoder or the audio decoder.

11. The system of claim 9, wherein the agent is configured to:
determine that the one or more measurements of the A/V latency are above a threshold.

12. The system of claim 9, wherein the agent is configured to:
determine that the lip-sync status indicates the audio and video data paths are out of sync by at least a threshold.

13. The system of claim 9, wherein the agent is configured to:
configure, responsive to the determination, the low latency mode on at least one of a Wi-Fi chip of the client device, an access point, or a communications interface connected to the client device.

14. The system of claim 9, wherein the agent is configured to:
determine, based on at least the one or more measurements of the A/V latency and the lip-sync status, to control a rate of output from at least one of the video decoder or the audio decoder.

15. The system of claim 9, wherein to configure the low latency mode on one of the video decoder or the audio decoder, the agent is configured to:
change a clock speed of at least one of the video decoder or the audio decoder.

16. The system of claim 9, wherein to configure the low latency mode on one of the video decoder or the audio decoder, the agent is configured to:
control one or more states of a buffer of at least one of the video decoder or the audio decoder.

17. A device comprising:
an audio decoder;
a video decoder; and
an agent, configured to:
- monitor video and audio data paths of an application communicating audio/video (A/V) data from one or more servers to the client device;
- measure, using the audio decoder and the video decoder, an A/V latency and a lip-sync status of the video and audio data paths of the application;
- determine, based on at least the one or more measurements of the A/V latency and the lip-sync status, to enable a low latency mode for at least one of the video decoder or the audio decoder; and
- configure, responsive to the determination, a low latency mode on one of the video decoder or the audio decoder.

18. The device of claim 17, wherein the agent is configured to:
- synchronize, responsive to the determination of the lip-sync status, the video and audio data paths at the client device using one of the video decoder or the audio decoder.

19. The device of claim 17, wherein the agent is configured to:
- determine that the one or more measurements of the A/V latency are above a threshold.

20. The device of claim 17, wherein the agent is configured to:
- determine that the lip-sync status indicates the audio and video data paths are out of sync by at least a threshold.

* * * * *